(12) United States Patent
Klaassen et al.

(10) Patent No.: US 12,734,528 B2
(45) Date of Patent: Sep. 15, 2026

(54) ROTATING INFEED CHUTE FOR A BRUSH CHIPPER

(71) Applicant: Vermeer Manufacturing Company, Pella, IA (US)

(72) Inventors: Stefan Klaassen, Wilhelminadorp (NL); Dolph Cantrijn, Breda (NL); Brian de Jong, Halsteren (NL); Wouter van Wezel, Roosendaal (NL); Nithy Nagendran, Middelburg (NL); Rinodh Thandal Ramasubramanian, Middelburg (NL); Hans van den Ende, Borssele (NL); Tim Traas, Heinkenszand (NL)

(73) Assignee: Vermeer Manufacturing Company, Pella, IA (US)

( * ) Notice: Subject to any disclaimer, the term of this patent is extended or adjusted under 35 U.S.C. 154(b) by 334 days.

(21) Appl. No.: 18/622,049

(22) Filed: Mar. 29, 2024

(65) Prior Publication Data

US 2024/0326064 A1 Oct. 3, 2024

Related U.S. Application Data

(60) Provisional application No. 63/493,403, filed on Mar. 31, 2023.

(51) Int. Cl.
*B02C 18/22* (2006.01)
*A01G 3/00* (2006.01)
(Continued)

(52) U.S. Cl.
CPC .......... *B02C 18/2291* (2013.01); *A01G 3/002* (2013.01); *B02C 21/02* (2013.01);
(Continued)

(58) Field of Classification Search
CPC ...... B02C 18/2291; B02C 2013/28672; B02C 2201/066; A01G 3/002
See application file for complete search history.

(56) References Cited

U.S. PATENT DOCUMENTS 3,270,968 A 9/1966 Hess et al.
3,524,595 A * 8/1970 Glidden ................ A23N 17/00 241/245
(Continued)

FOREIGN PATENT DOCUMENTS

DE 20008182 U1 8/2000
EP 3061581 A1 * 8/2016 ............ B27L 11/002
(Continued)

OTHER PUBLICATIONS

European Patent Office Extended Search Report for Application No. 24166790.6 dated May 21, 2024 (10 pages).
(Continued)

*Primary Examiner* — Jared O Brown
(74) *Attorney, Agent, or Firm* — Michael Best & Friedrich LLP

(57) ABSTRACT

A material reduction machine includes an infeed chute and a processing portion. The infeed chute has a plurality of guide walls. The processing portion is coupled to the infeed chute. The processing portion has a rotatable cutting mechanism configured to receive material from the infeed chute along a feed axis. The infeed chute is rotatable relative to the processing portion about an axis parallel to the feed axis between an operational configuration and a transport configuration.

19 Claims, 27 Drawing Sheets

(51) Int. Cl.

| | |
|---|---|
| ***B02C 21/02*** | (2006.01) |
| ***B27L 11/00*** | (2006.01) |
| *B02C 25/00* | (2006.01) |

(52) U.S. Cl.
CPC .......... *B02C 21/026* (2013.01); *B27L 11/002* (2013.01); *B02C 25/00* (2013.01); *B02C 2201/066* (2013.01)

(56) References Cited

U.S. PATENT DOCUMENTS

| | | | | | |
|---|---|---|---|---|---|
| 4,773,601 | A * | 9/1988 | Urich | B02C 18/067 | 241/189.1 |
| 5,340,035 | A * | 8/1994 | Ford | A01G 20/47 | 241/58 |
| 5,692,549 | A | 12/1997 | Eggers | | |
| 5,860,606 | A * | 1/1999 | Tiedeman | B02C 18/2291 | 241/285.2 |
| 7,121,488 | B1 | 10/2006 | Marriott et al. | | |
| 7,546,964 | B2 | 6/2009 | Bouwers | | |
| 7,823,813 | B2 | 11/2010 | Galloway et al. | | |
| 8,317,117 | B2 | 11/2012 | Galloway et al. | | |
| 8,567,706 | B2 | 10/2013 | Bradley et al. | | |
| 8,602,333 | B2 | 12/2013 | Bradley et al. | | |
| 8,684,291 | B2 | 4/2014 | Galloway et al. | | |
| 9,868,121 | B2 | 1/2018 | Kennedy et al. | | |
| 10,245,592 | B2 | 4/2019 | Kennedy | | |
| 11,014,791 | B2 | 5/2021 | Magill et al. | | |
| 2006/0113412 | A1* | 6/2006 | Umeda | B02C 18/067 | 241/101.74 |
| 2010/0126628 | A1 | 5/2010 | Leonard | | |
| 2014/0209721 | A1* | 7/2014 | Kennedy | B02C 25/00 | 241/37.5 |
| 2021/0229108 | A1 | 7/2021 | Soldan et al. | | |

FOREIGN PATENT DOCUMENTS

| | | | | |
|---|---|---|---|---|
| JP | H11319624 | A | 11/1999 | |
| JP | 2000202808 | A * | 7/2000 | |
| KR | 20110105238 | A * | 9/2011 | B02C 13/282 |

OTHER PUBLICATIONS

Timberwolf, TW 150VTR/FTR Instruction Manual, p. 12, Accessed on Jun. 3, 2024 (1 page).

Ufkes Greentec, <https://www.ufkes.net/index.php/machines/wood-chippers/?lang=en>, Accessed on Sep. 21, 2022.

Rabaud, Self-propelled wood chipper Vegetor 110 C, Agri Expo, <https://www.agriexpo.online/prod/rabaud/product-170073-59794.html>, Accessed on Jun. 4, 2024.

TP, Product Catalogue TP Mobile 215 & 280, "Mobile & Power For Heavy Duty", 2021, (24 pages).

TP Wood Chippers, "TP 175 Mobile", YouTube, <https://www.youtube.com/watch?v=7MLP0ysDnBk>, uploaded on Jan. 21, 2024, relevant portions at 0:28 and 0:29 seconds (2 pages).

* cited by examiner

ROTATING INFEED CHUTE FOR A BRUSH CHIPPER

CROSS-REFERENCE TO RELATED APPLICATIONS

This application claims priority to U.S. Provisional Patent Application No. 63/493,403, filed on Mar. 31, 2023, the entire contents of which are incorporated by reference herein.

BACKGROUND

Chippers are used to reduce branches, trees, brush, and other bulk wood products into small wood chips. A chipper typically includes an infeed chute, an infeed portion for controlling the feed rate of wood products into the chipper, a chipping mechanism, a drive system for powering the infeed portion and the chipping mechanism, and a discharge chute. The infeed chute cooperates with the infeed portion to guide the wood products towards the chipping mechanism.

Through the operation of the infeed portion, products to be chipped are brought into contact with the chipping mechanism, which grinds, flails, or cuts the wood products into small pieces. These chips are propelled into the discharge chute and expelled from the chipper.

Chippers may be pull-type (i.e., mounted on a trailer) or self-propelled. It is desirable to have a wide infeed chute to facilitate material loading.

SUMMARY

In one independent aspect, a material reduction machine includes an infeed chute and a processing portion. The infeed chute has a plurality of guide walls. The processing portion is coupled to the infeed chute. The processing portion has a rotatable cutting mechanism configured to receive material from the infeed chute along a feed axis. The infeed chute is rotatable relative to the processing portion about an axis parallel to the feed axis between an operational configuration and a transport configuration.

In another independent aspect, a material reduction machine includes a front end, a rear end opposite the front end, a processing portion, and an infeed chute. The processing portion is disposed between the front end and the rear end. The processing portion has a cutting mechanism. The infeed chute opens toward the rear end to receive material to be reduced. The infeed chute has a plurality of guide walls configured to guide the material toward the processing portion along a feed axis. The infeed chute is configured to rotate relative to the processing portion between an operational configuration and a transport configuration. When viewed along the feed axis, the material reduction machine defines an operational width when the infeed chute is in the operational configuration and a transport width when the infeed chute is in the transport configuration. The transport width is less than the operational width.

In yet another independent aspect, a material reduction machine includes a front end, a rear end spaced longitudinally from the front end, an infeed chute, a main portion, and a rotation bearing. The infeed chute is disposed adjacent the rear end and has a feed table and a plurality of guide walls. The feed table and the plurality of guide walls form a funnel that narrows from a distal end to a proximal end of the infeed chute. The infeed chute, as viewed longitudinally, has a first outer dimension and a second outer dimension. The first outer dimension is larger than the second outer dimension.

The main portion includes a processing portion with a rotatable cutting mechanism driven by a prime mover. The main portion has an inlet side coupled to the proximal end of the infeed chute to define a joint through which the material can pass from the infeed chute toward the rotatable cutting mechanism along a feed axis. The rotation bearing is situated longitudinally at the joint and encircles the joint to support the rotation of the entire infeed chute about a longitudinal axis of at least 90 degrees between an operational configuration and a transport configuration. In the operational configuration, the feed table is below the feed axis. In the transport configuration, the feed table is laterally alongside the feed axis. The first outer dimension of the infeed chute extends in a horizontal direction in the operational configuration of the infeed chute. The first outer dimension of the infeed chute extends in the vertical direction in the transport configuration of the infeed chute. When viewed longitudinally, an overall width of the material reduction machine is reduced by rotation of the infeed chute from the operational configuration to the transport configuration.

DETAILED DESCRIPTION

Figure 1:
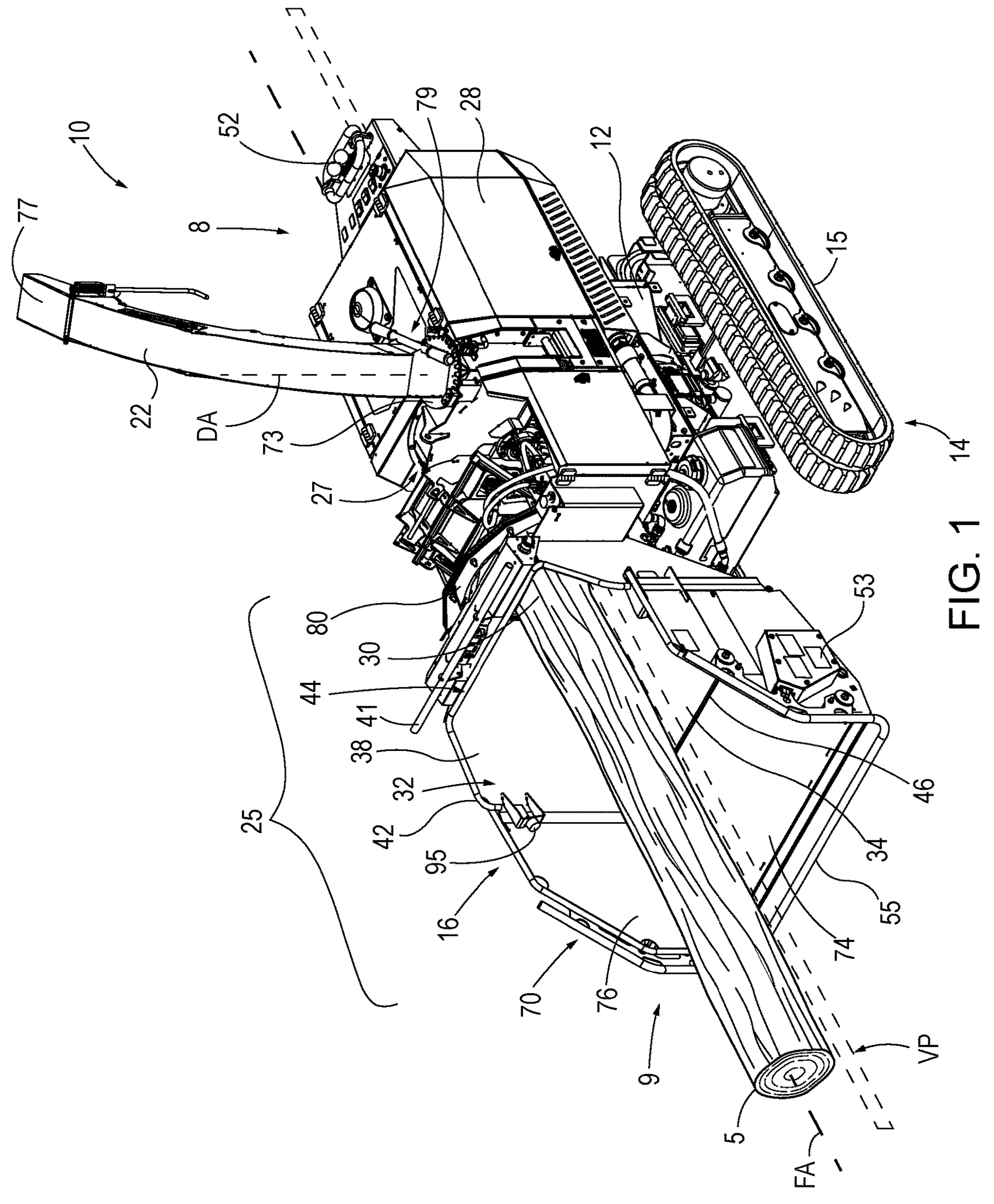
FIG. 1 is a rear perspective view of a chipper according to one embodiment of the present disclosure.
Figure 2:
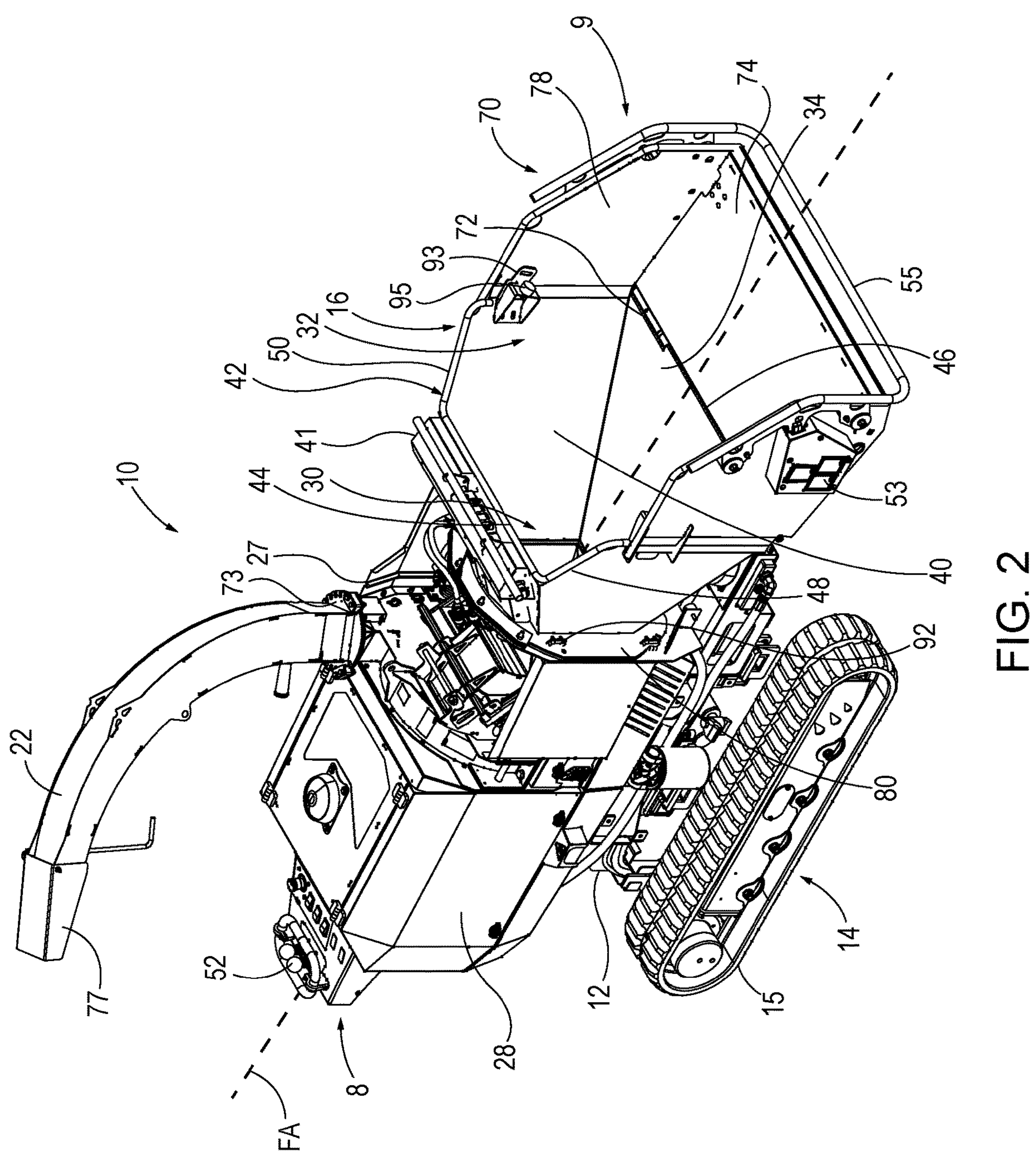
FIG. 2 is another rear perspective view of the chipper of FIG. 1 in the chipping position.

Before any embodiments, examples, aspects, or features are explained in detail, it is to be understood that those embodiments, examples, aspects and features are not limited in their application to the details of construction and the arrangement of components set forth in the following description or illustrated in the following drawings. Other embodiments, examples, aspects, and features are possible and are capable of being practiced or of being carried out in various ways. Also, it is to be understood that the phraseology and terminology used herein is for the purpose of description and should not be regarded as limiting.

FIGS. 1-23 illustrate a material reduction machine, such as a brush chipper 10 according to one embodiment. The brush chipper 10 includes a frame 12, an infeed portion 25, a processing portion 27, a discharge portion 20, and a control system 51 having a controller 56. The brush chipper 10 is configured to receive material 5 (e.g., brush, tree parts, etc.), process the material 5 into smaller pieces, and discharge the processed material 5. The frame 12 supports or may form part of the infeed portion 25, part of the processing portion 27, and part of the discharge portion 20. The brush chipper 10 defines a first end or a front end 8 and a second end or a rear end 9 longitudinally spaced from the front end 8. The brush chipper 10 has a vertical plane VP that extends between the front end 8 and the rear end 9. The frame 12 may be centered along the vertical plane VP. In the illustrated embodiment, the center of the frame 12 is defined by the center of a ground drive 14 or, more specifically, the midpoint between the track mounts (described in detail below) of the ground drive 14. The infeed portion 25, more specifically the infeed chute (described in detail below) of the infeed portion 25, is not centered along the vertical plane VP. In some embodiments, the infeed portion 25, the processing portion 27, and the discharge portion 20 are all be centered along the vertical plane VP such that the vertical plane VP bisects the brush chipper 10. In some embodiments, the infeed portion 25, the processing portion 27, the discharge portion 20, and/or the frame 12 are not centered along the vertical plane VP.

The components of the brush chipper 10, particularly the infeed portion 25 and a cutting mechanism (described in detail below) of the processing portion 27, are driven by a prime mover system 28, such as an internal combustion engine 24 (e.g., gasoline engine or diesel engine), an electric drive motor, or a combination thereof. The prime mover system 28 may also provide power to secondary systems such as hydraulic systems (not shown) for powering motors (e.g., ground drive motors) and/or actuators in the brush chipper 10. The prime mover system 28 may be supported by the frame 12 and is at least partially controlled by the control system 51.

The frame 12 may include a ground drive 14 that allows the brush chipper 10 to travel. The ground drive 14 may be tracks 15 that are powered by the prime mover system 28. The ground drive 14 has a first track on one side of the vertical plane VP and a second track on the other side of the vertical plane VP. The tracks 17 are secured to the frame 12 by track mounts 17. The vertical plane VP bisects the ground drive 14. The track mounts 17 are equally spaced from the vertical plane VP.

The ground drive 14 may comprise a hydraulic pump and hydraulic motor to provide motion to tracks 15. Controls 52 may allow an operator to control the movement of the ground drive 14, enabling the brush chipper 10 to traverse forward, back, left, right, and/or counter-steer. In the illustrated embodiment, the controls 52 are located adjacent the front end 8, however in other embodiments, the controls 52 may be located in other areas of the brush chipper 10. The controls 52 may be connected to the controller 56 of the control system 51. Alternatively, a remote control 54 may be utilized to interact with the controller 56 to control the ground drive 14.

The tracks 15, or other alternative ground drive such as wheels, may be configured to move perpendicular to the vertical plane VP and move relative to the track mounts 17. More specifically, the tracks 15 may move between a wide position defining a width TW (FIG. 6) and a narrow position defining a width TN (FIG. 7) smaller than the wide position width TW. In the wide position, the tracks 15 are spaced from the track mounts 17, provide a wider base for the brush chipper 10, and improve the stability of the brush chipper 10. In the narrow position, the tracks 15 are adjacent the track mounts 17, closer to the vertical plane VP, and provide a narrow base for the brush chipper 10 allowing for the brush chipper 10 to pass through narrow locations. The operator may control the position of the tracks 15 with controls 52 or the remote control 54.

In the illustrated embodiment, the infeed portion 25 is located adjacent the rear end 9 of the brush chipper 10. The infeed portion 25 is configured to feed the material 5 into the processing portion 27. The infeed portion 25 includes at least one feed roller 18. The infeed portion 25 is configured to receive the material 5, through an infeed chute 16, manually by insertion of one or more pieces at a time (either with or without the aid of a machine such as a skid steer), rather than a continuous stream as would be provided by a conveyor or other automated means. The infeed chute 16 is coupled to a rear or inlet side of the infeed portion 25.

The infeed chute 16 is a funnel that opens toward the rear end 9 and facilitates the loading of materials to be reduced into the brush chipper 10. The infeed chute 16 may be formed from a plurality of guide walls, for example a feed table 34 and a plurality of additional guide walls that extend from the feed table 34. More specifically, the infeed chute 16 may include the feed table 34, a first side 38, second side 40, and a top portion 36. The feed table 34 is configured to extend under and, as needed, support the weight of material fed into the chipper 10. The feed table 34, the top portion 36, the first side 38, and the second side 40 may be composed of multiple segments or surfaces positioned at differing angles, such as that disclosed in U.S. Pat. No. 8,602,333 of Vermeer Mfg. Co., the entire contents of which are incorporated by reference herein.

Figure 5:
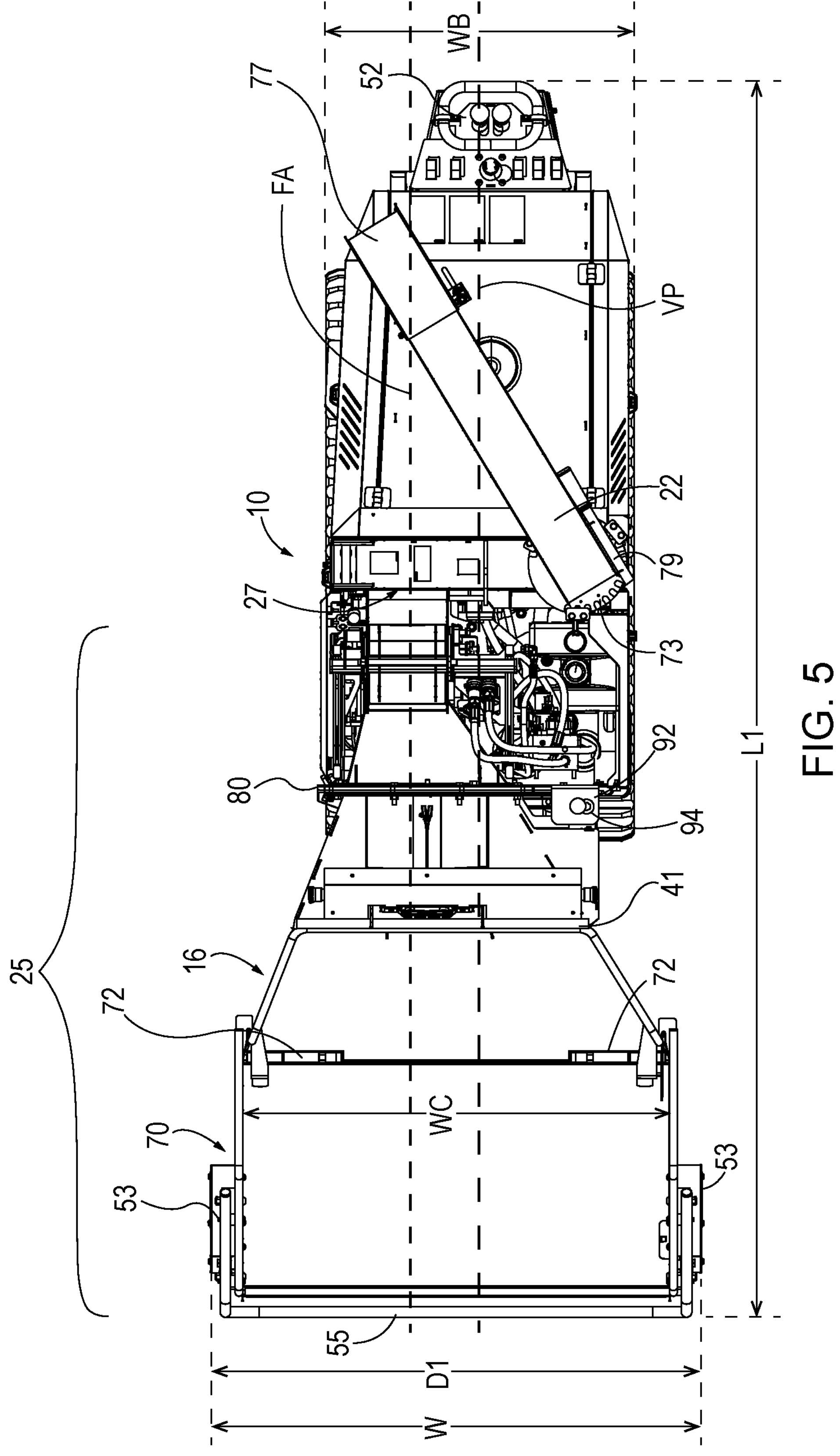
FIG. 5 is a top view of the chipper of FIG. 2.
Figure 6:
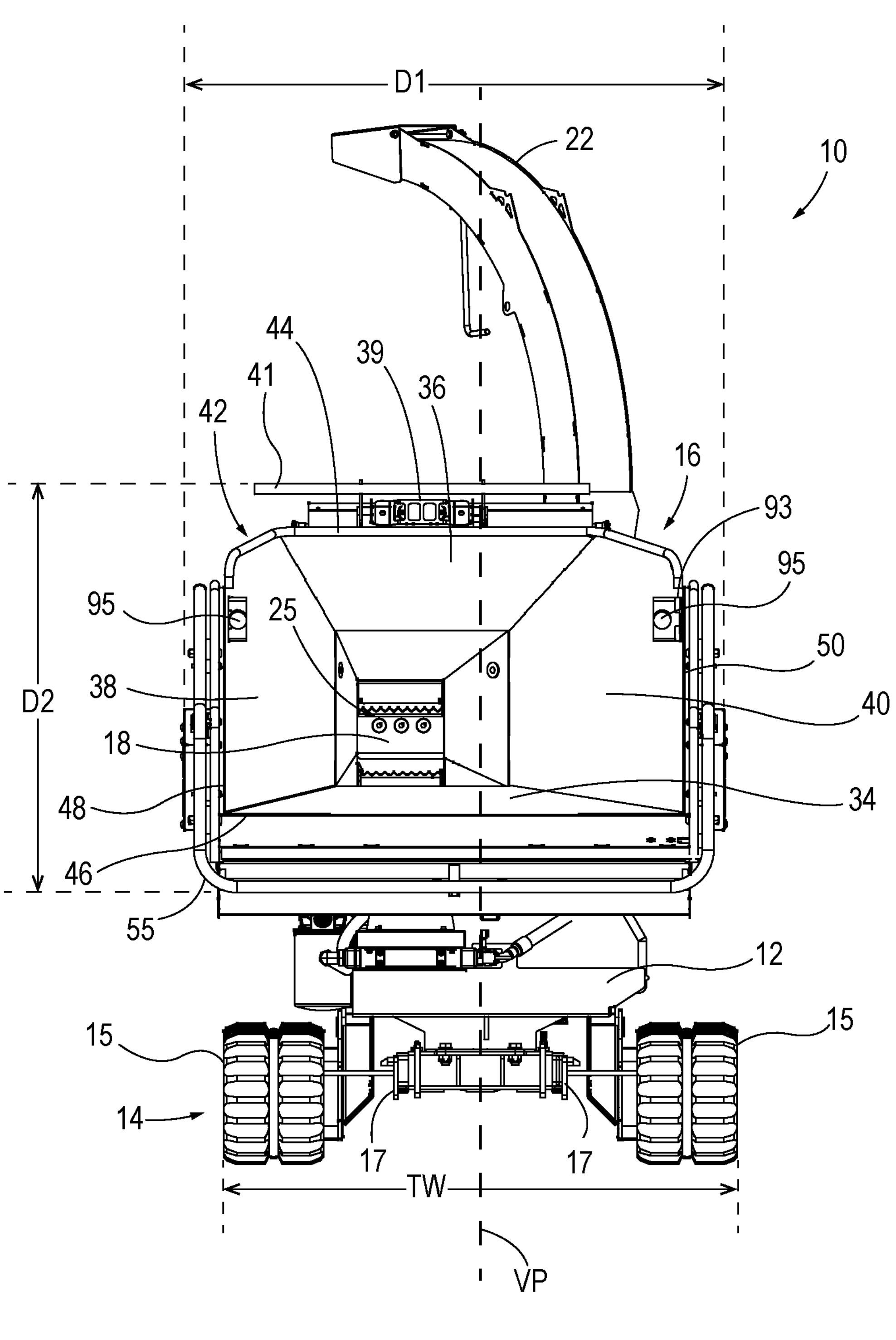
FIG. 6 is a rear view of the chipper of FIG. 2 with the ground drive tracks in a wide position.
Figure 7:
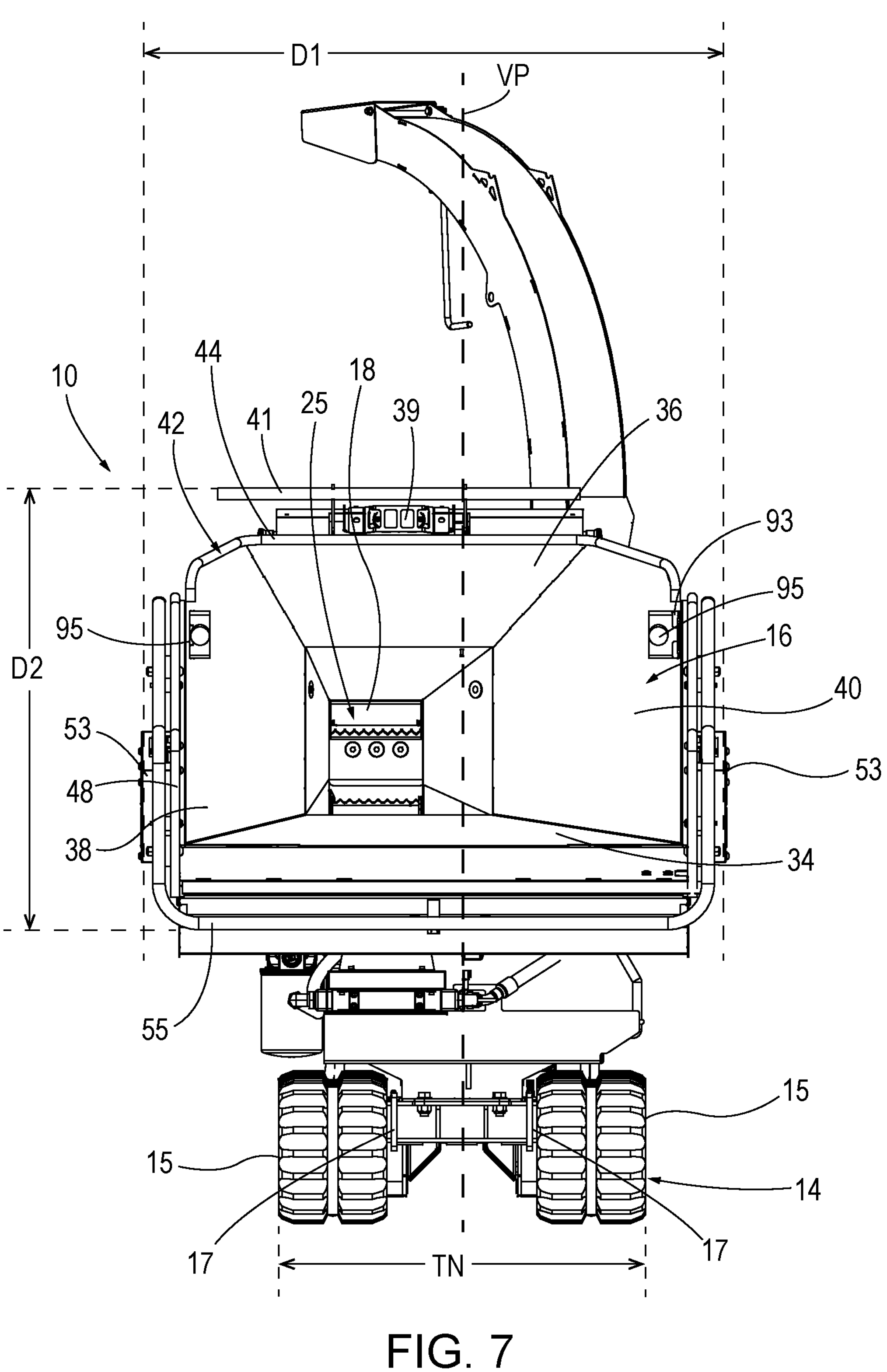
FIG. 7 is an additional rear view of the chipper of FIG. 2 with the ground drive tracks in a narrow position.
Figure 8:
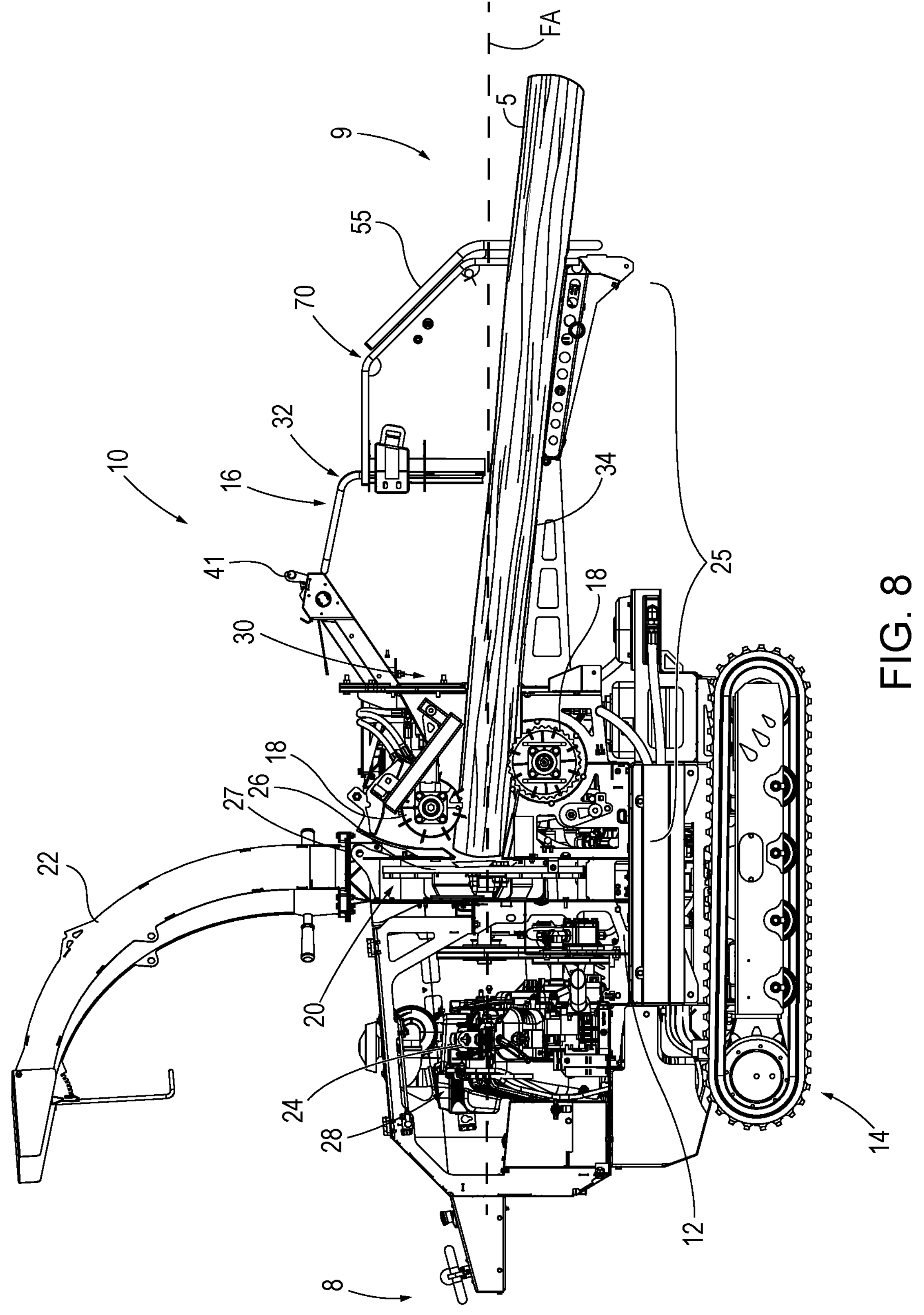
FIG. 8 is a side view of the chipper of FIG. 2 showing the internal components of the chipper.

The position and shape of the feed table 34, the first side 38, the second side 40, and the top portion 36 are configured to be wide at the rear end 9 of the brush chipper 10 then taper toward the front end 8. More specifically, the infeed chute 16 includes a wide end 32 (e.g., a distal end) adjacent the rear end 9 and a narrow end 30 (e.g., a proximal end) that is opposite the wide end 32 (FIG. 1). In the illustrated embodiment, the size or area of the opening at the wide end 32 is more than twice as large as the area of the opening at the narrow end 30. The wide end 32 may define a width WC, where WC is the widest portion of the infeed chute 16 (FIG. 5). The relative size difference between the ends 30, 32 is partially a result of the sizing of the infeed portion 25 and the processing portion 27 being smaller than the wide end 32 of the infeed chute 16. In the illustrated embodiment, the sides 38, 40 of the infeed chute 16 angle towards the feed rollers 18. While in use, the feed table 34, the top portion 36, the first side 38, and the second side 40 may guide and/or compress the material 5 as the infeed portion 25 pulls the material 5 into the processing portion 27.

Figure 15:
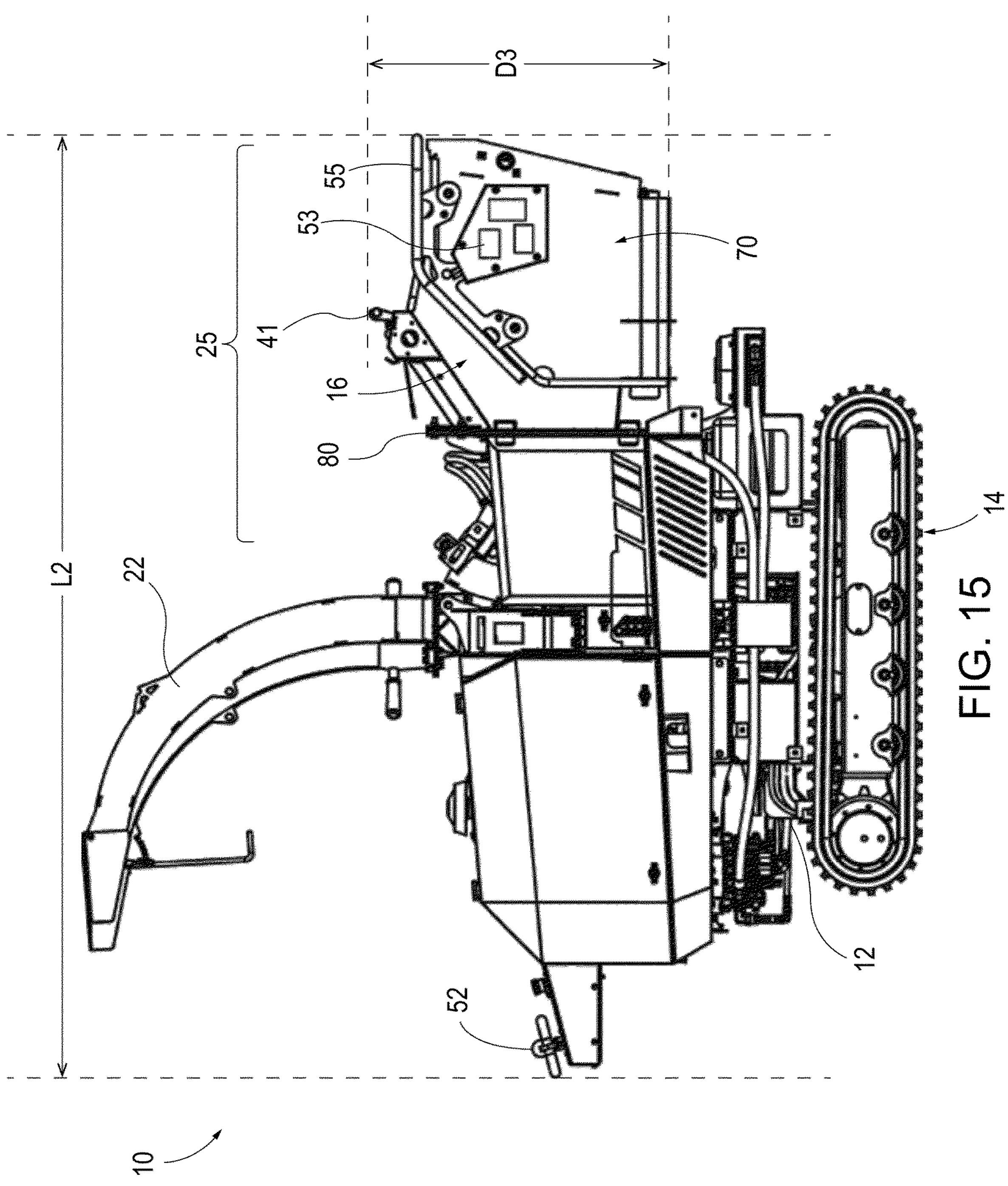
FIG. 15 is a side view of the chipper of FIG. 14.
Figure 16:
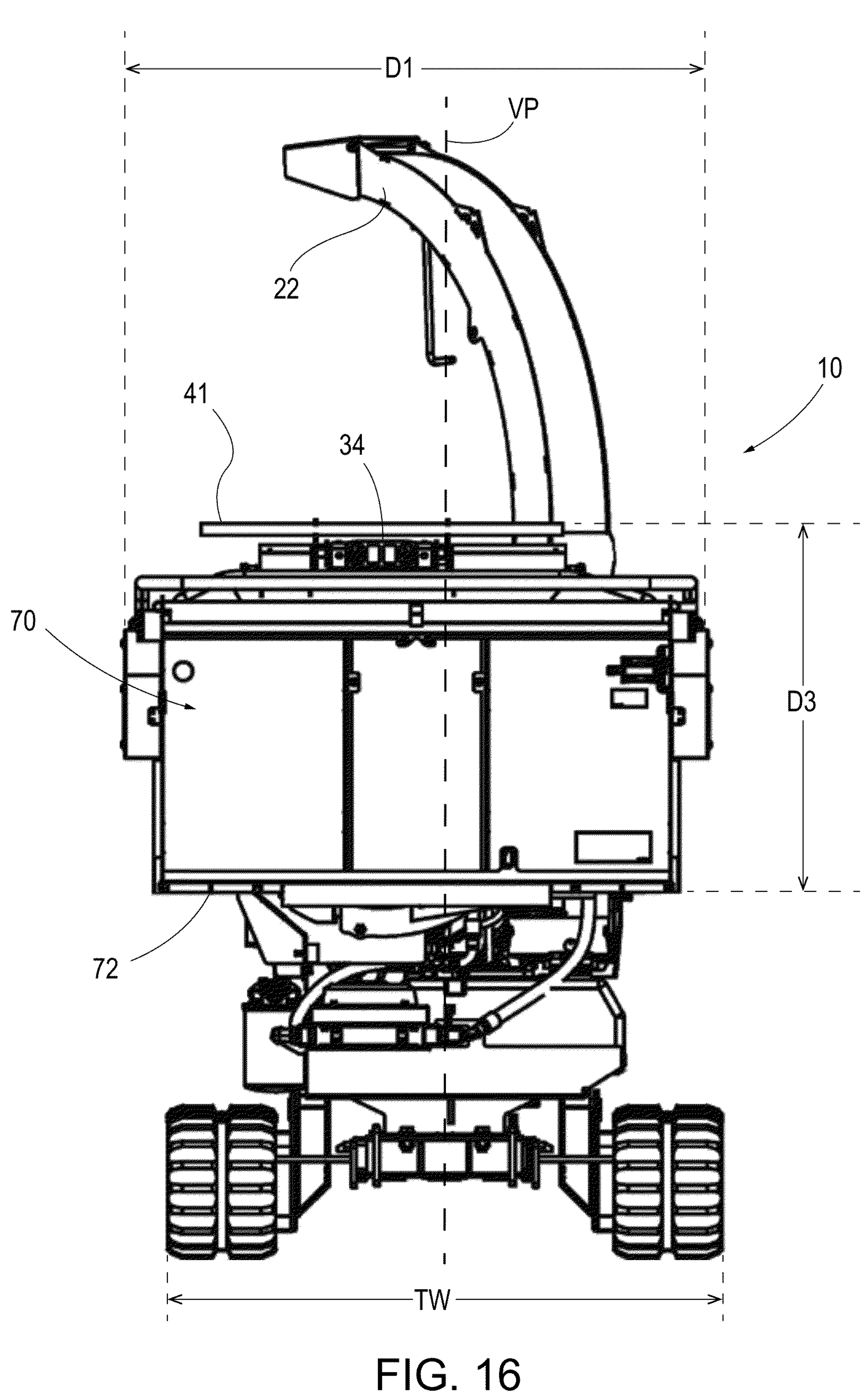
FIG. 16 is a rear view of the chipper of FIG. 14.
Figure 17:
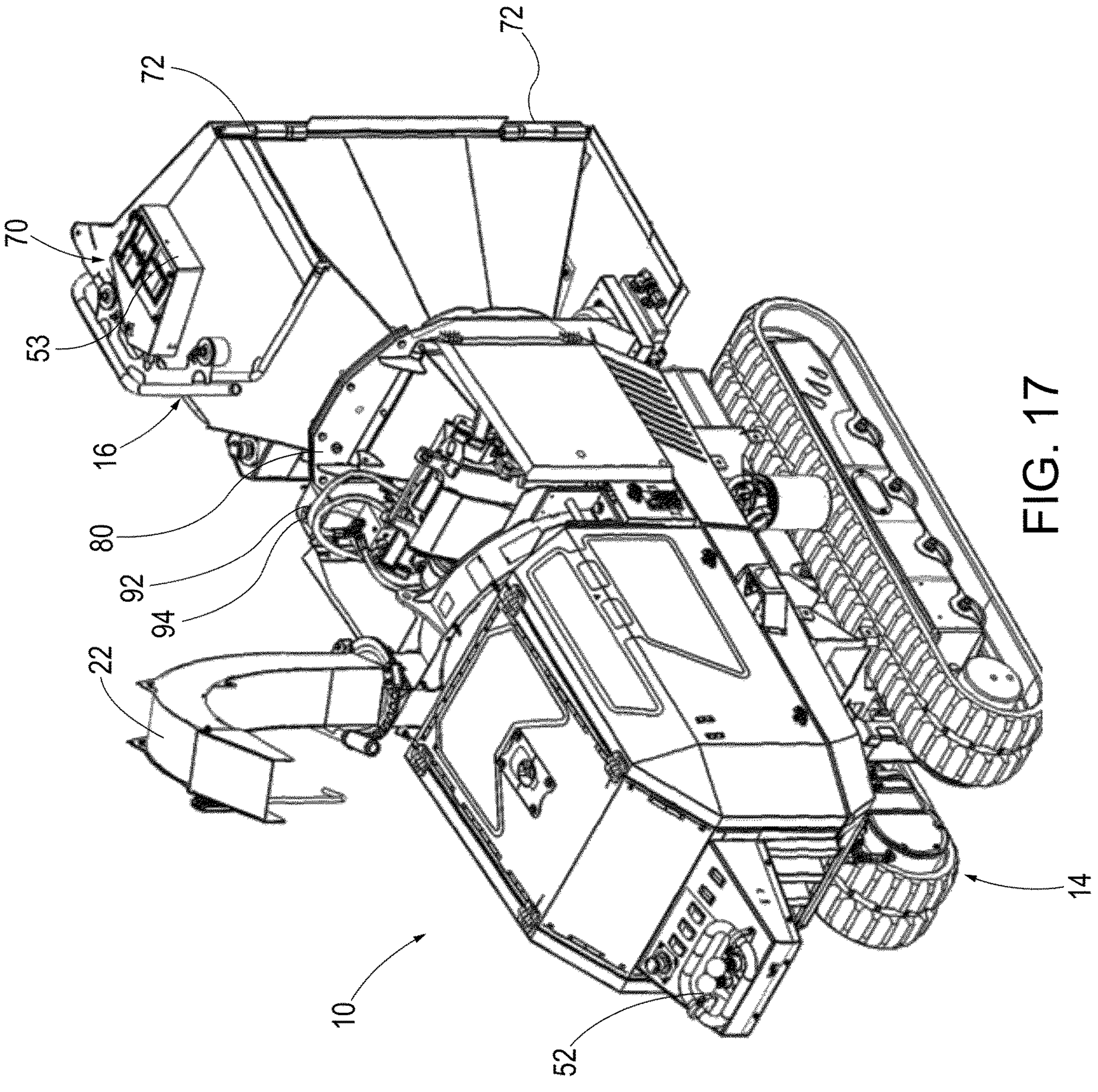
FIG. 17 is a front perspective view of the chipper of FIG. 1 with a folded infeed chute in a rotated position.
Figure 18:
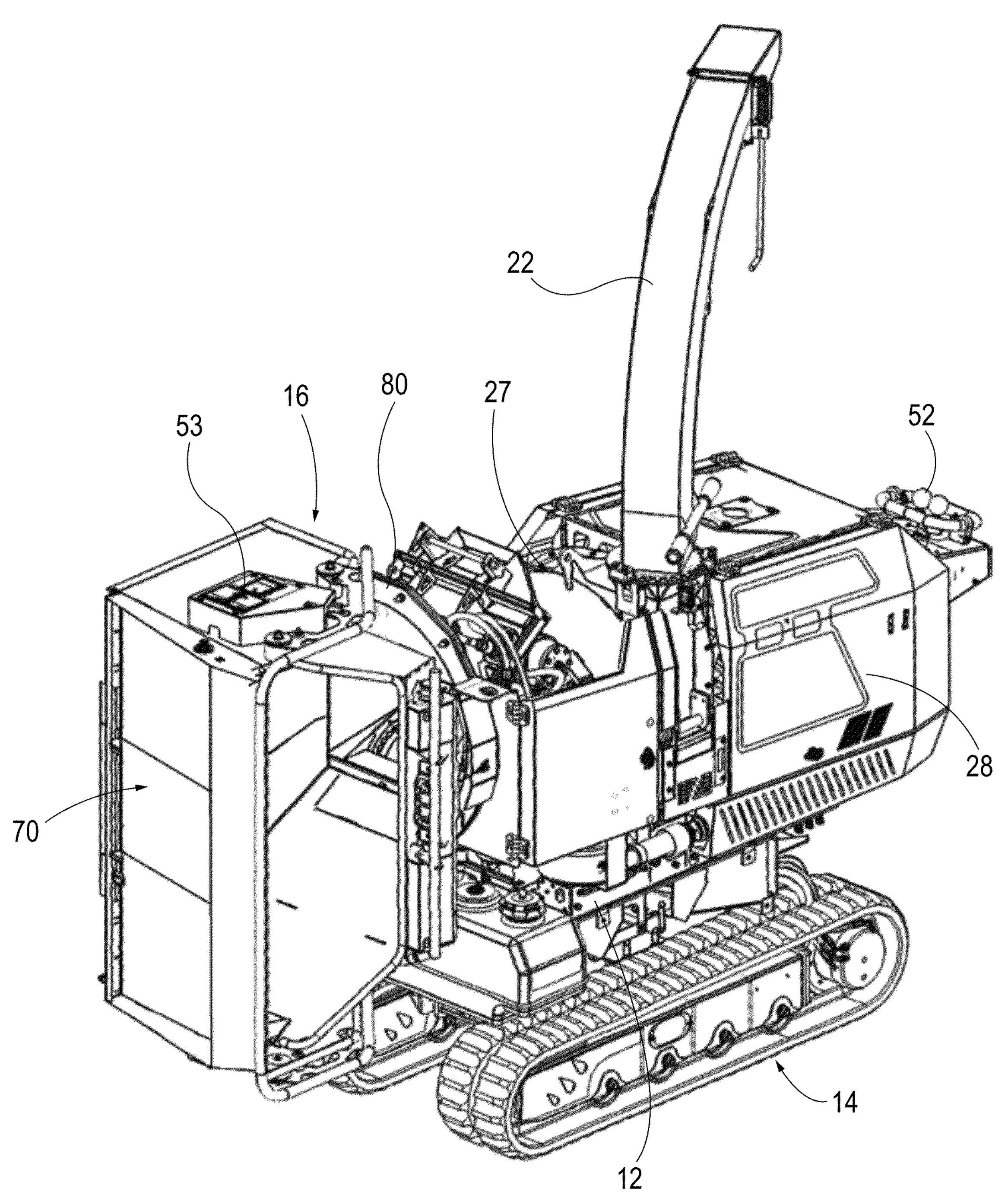
FIG. 18 is a rear perspective view of the chipper of FIG. 17.
Figure 19:
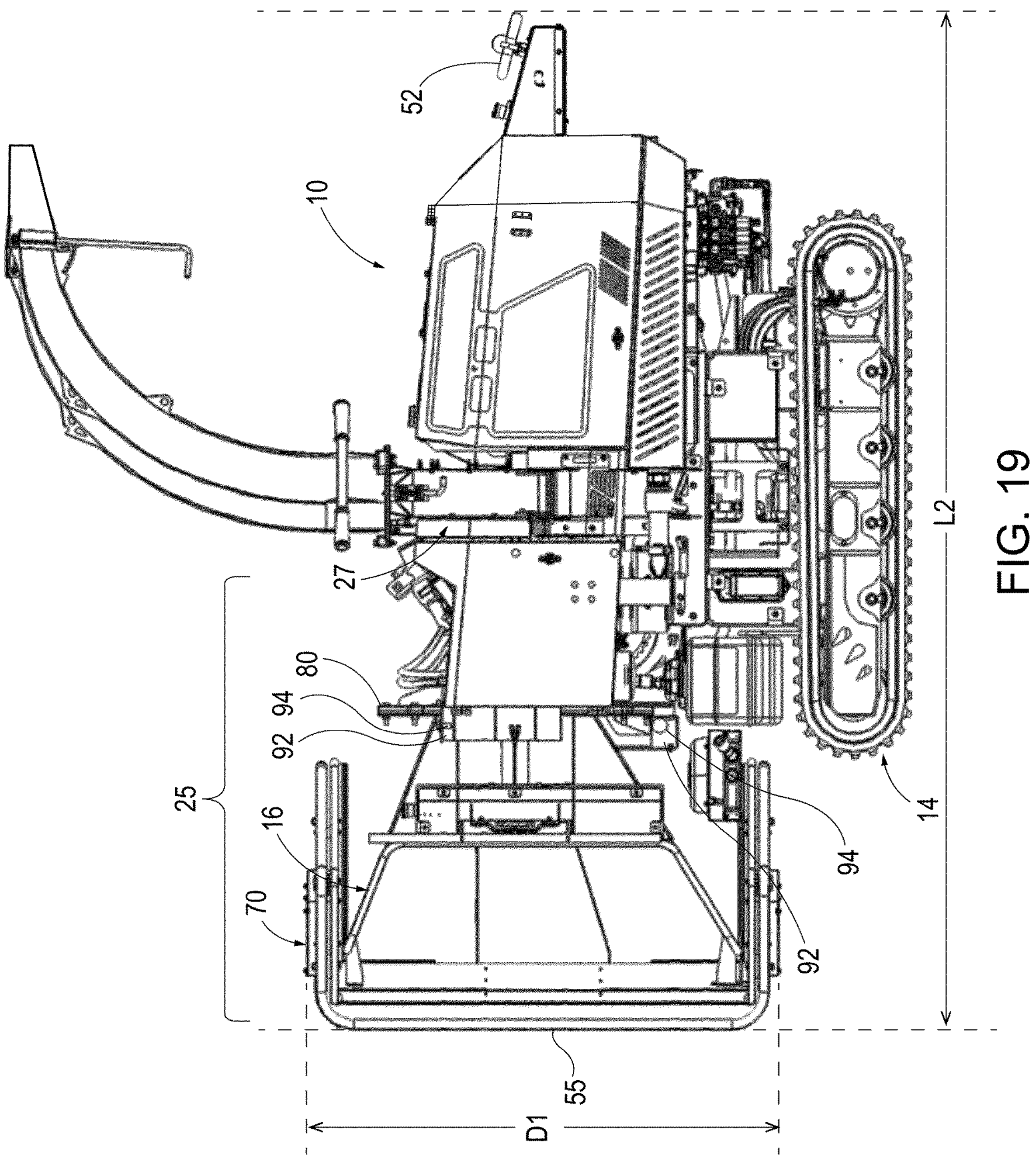
FIG. 19 is a side view of the chipper of FIG. 17.
Figure 20:
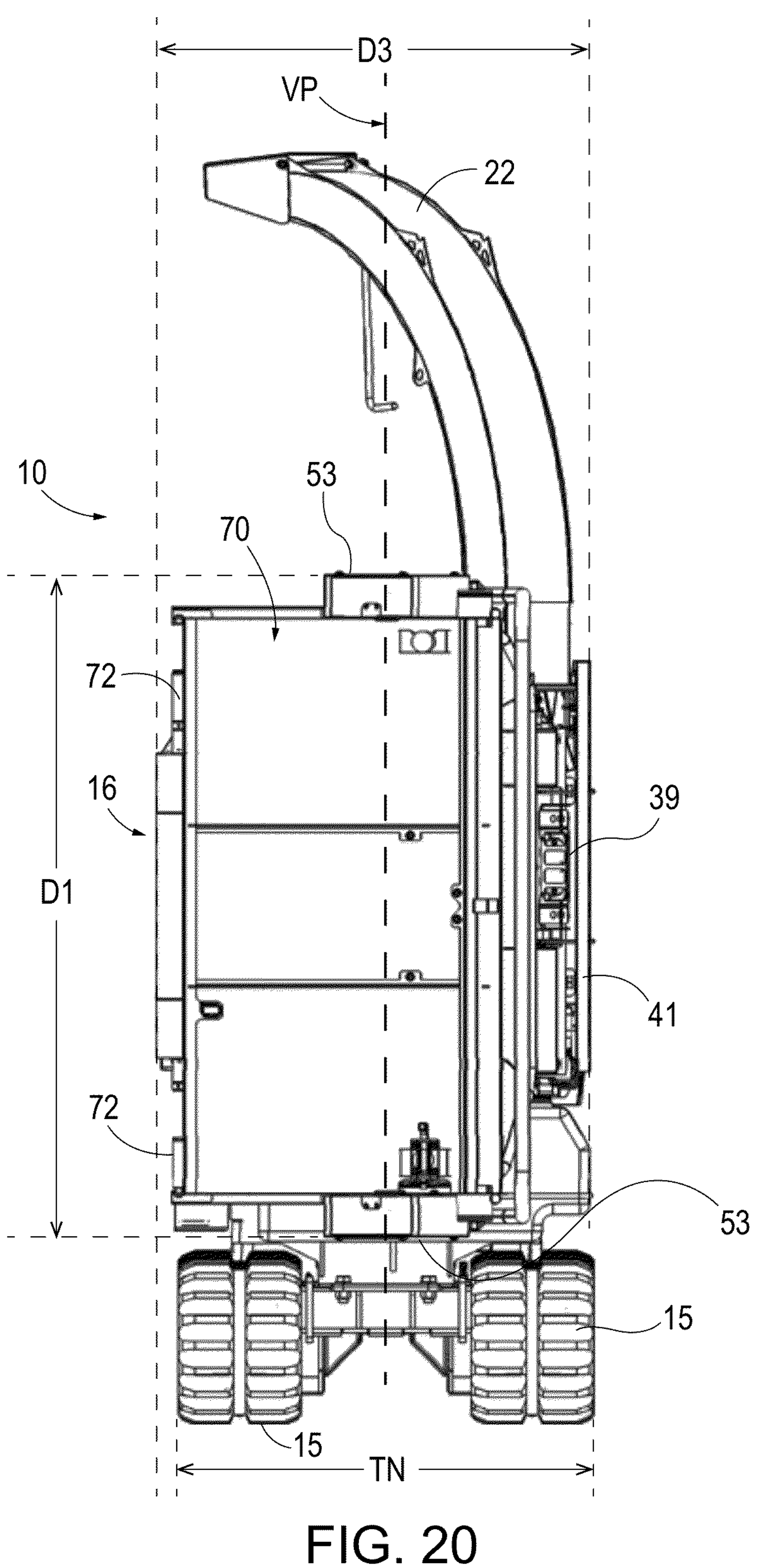
FIG. 20 is a rear view of the chipper of FIG. 17.
Figure 21:
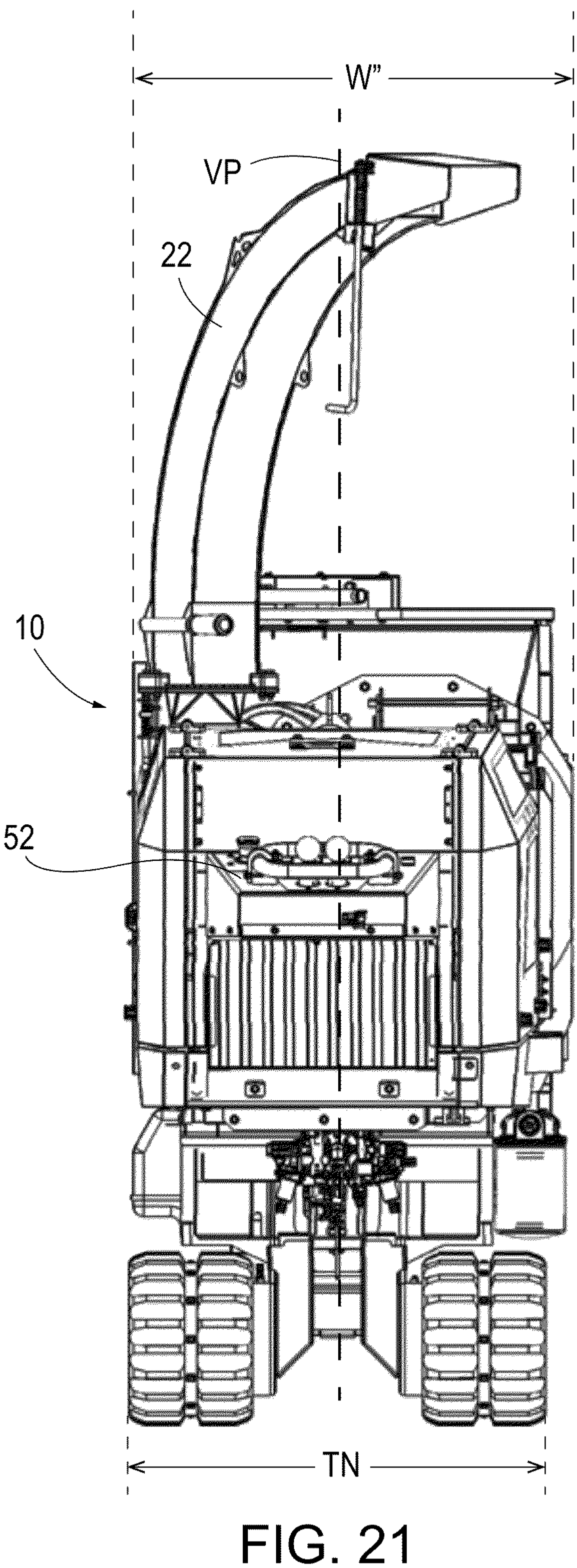
FIG. 21 is a front view of the chipper of FIG. 17.

The infeed chute 16 may have a foldable portion 70 pivotably connected to the wide end 32 of the infeed chute 16. The foldable portion 70 pivots about hinges 72 between a folded position (FIGS. 14-22) and an unfolded position (FIGS. 1-13). The foldable portion 70 pivots perpendicular to a feed axis (described in detail below) or pivots relative to the feed table 34. The overall length of the machine 10 is reduced when the foldable portion 70 is in the folded position (L2, FIGS. 15, 19 is less than L1, FIGS. 4, 5). A latch 93 (FIGS. 6 and 7) may secure the foldable portion 70 in the folded position. When the foldable portion 70 is in the unfolded position, gravity and/or latches ensures the foldable portion 70 remains unfolded. In some embodiments, one or more latches may secure the foldable portion 70 in the folded position and in the unfolded position.

The surfaces (e.g., a first side 38, second side 40, and feed table 34) of the infeed chute 16 may correspond to adjacent surfaces of the foldable portion 70 such that the foldable portion 70 and the infeed chute 16 form a continuous funnel when the foldable portion 70 is in the unfolded position. For example, the feed table 34 may be extended to the bottom surface 74 of the foldable portion 70. Similarly, the first side 38 of the infeed chute 16 may be extended to a first side 76 of the foldable portion 70, and the second side 40 of the infeed chute 16 may be extended to the second side 78 of the foldable portion 70. In the illustrated configuration, the top portion 36 of the infeed chute 16 does not have a corresponding feature on the foldable portion 70. The corresponding surfaces 34 and 74, 38 and 76, and 40 and 78 predominately face the interior of the brush chipper 10 and the corresponding surfaces cooperate to form a surface (e.g., a funnel) for guiding materials toward the opening at the narrow end 30.

In the illustrated embodiment, the surfaces of the infeed chute 16 or the foldable portion 70 define a periphery edge 42 of the wide end 32 of the infeed chute 16. The periphery edge 42 includes a top edge 44, a bottom edge 46, a side edge 48, and a second side edge 50. The top edge 44 of the periphery edge 42 is positioned closer to the narrow end 30 than the bottom edge 46 of the periphery edge 42 because the top portion 36 does not extend the length of the infeed chute 16. The side edge 48, 50 may have sloping upper portions and/or lower portions when viewed from the rear end 9 and/or side.

In some embodiments, the infeed portion 25 may include additional components attached to the infeed chute 16 such as a protective bar 41, a plurality of lights 39, chipper controls 53, and/or a control bar 55. The brush chipper 10 may have chipper controls 53 disposed on the first side 38 (e.g., on the first side 76 of the foldable portion 70) and/or on the second side 40 (e.g., on the second side 78 of the foldable portion 70). The chipper controls 53 and the control bar 55 are connected to the controller 56 and may be utilized by the operator to control the infeed portion 25 and/or the processing portion 27. The brush chipper controls 53 and/or the control bar 55 allow the operator to control the infeed portion 25 by controlling forward rotation, rearward rotation, or stopping rotation of the infeed roller 18.

In operation, the infeed roller 18 grabs and pulls the material 5 from the infeed chute 16 into the processing portion 27 of the brush chipper 10. The material 5 enters the processing portion 27 along the feed axis FA (FIG. 1). Said another way, the material 5 passes from the infeed chute 16 toward a cutting mechanism (described in detail below) along the feed axis FA. When the material 5 is situated on the infeed chute 16, it may or may not lie on the feed axis FA. For example, a portion of the material 5 that is located near the wide end 32 and is upstream from the processing portion 27 may or may not be situated on the feed axis FA.

The feed axis FA is parallel to the vertical plane VP and is perpendicular to the flange (described in detail below) that connects the infeed chute 16 to the main body of the brush chipper 10. In the illustrated embodiment, the infeed chute 16 is not centered on the vertical plane VP, such that the feed axis FA is offset from the vertical plane VP. In the illustrated embodiment, the feed axis FA is generally horizontal, however in some embodiments the feed axis may be angled relative to the ground, or nearly vertical (FA') as shown in FIGS. 24-27.

The infeed roller 18 is located adjacent the narrow end 30 of the infeed chute 16. In the illustrated embodiment, the infeed portion 25 includes at least one horizontal roller 18. In some configurations, the infeed portion 25 may have multiple feed rollers 18, for example, there may be an upper feed roller and a lower feed roller, or a left feed roller and a right feed roller. The controller 56 uses infeed control logic to control the infeed roller 18. The infeed control logic may be similar to that disclosed in U.S. Patent Application Publication No. 2021/0229108 of Vermeer Mfg. Co., the entire contents of which are incorporated by reference herein, or any other system known in the art or later developed.

Figure 4:
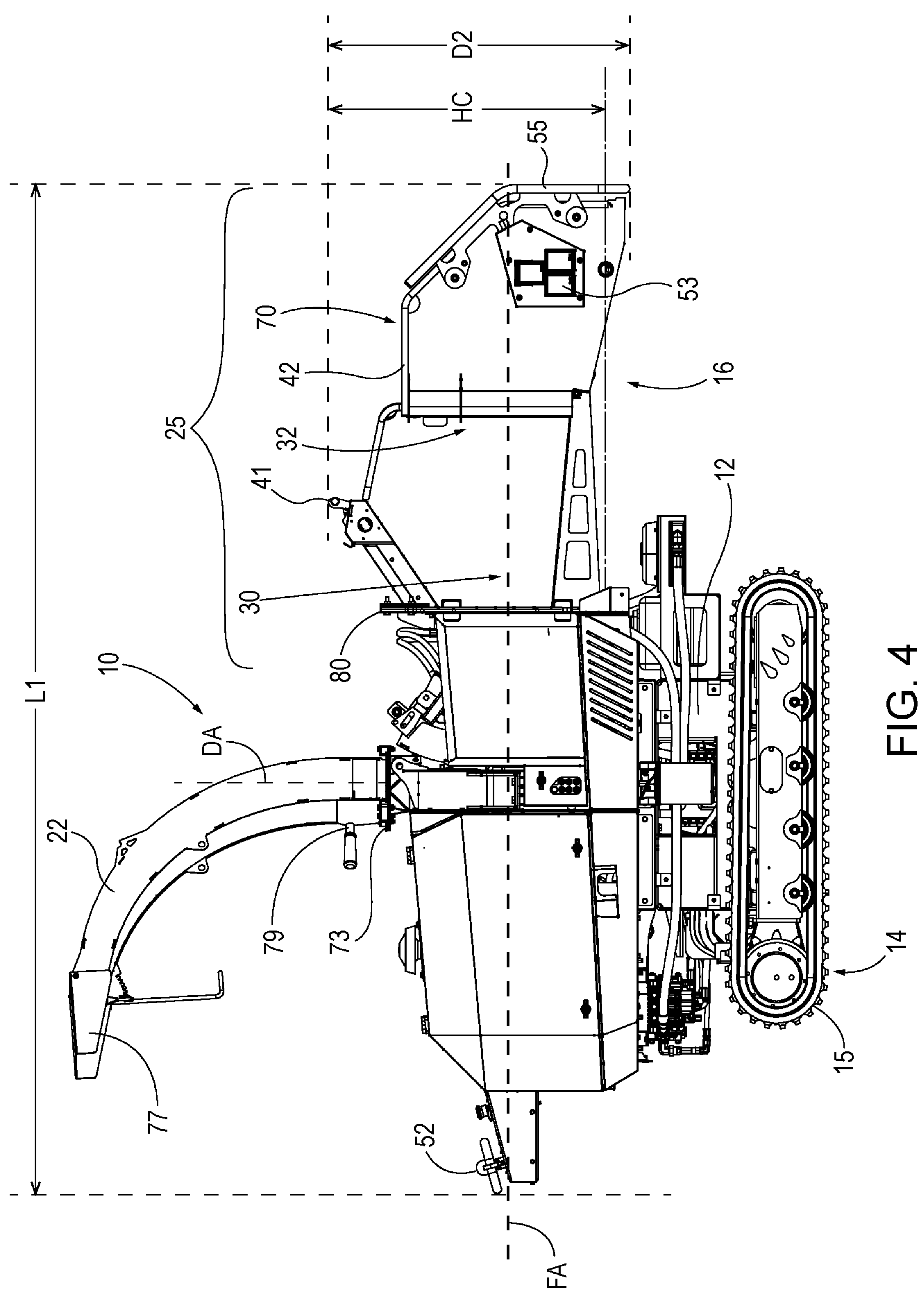
FIG. 4 is a side view of the chipper of FIG. 2.

Without the foldable portion 70, the widest part of the infeed chute 16 has a width of WC (FIG. 5), and the tallest part of the infeed chute 16 has a maximum height of HC (FIG. 4). Without the foldable portion 70, the maximum width WC and the maximum height HC represent first and second outermost dimensions of the infeed chute 16, measured perpendicular to each other. In the illustrated embodiment, the maximum width WC is larger than the maximum height HC.

The infeed chute 16 defines a first outer dimension D1 (FIG. 6), and the infeed chute 16 defines a second outer dimension D2 (FIG. 6) when the infeed chute 16 is in the unfolded position. Instead of the second outer dimension D2, the infeed chute 16 defines a third outer dimension D3 (FIG. 16) when the infeed chute 16 is in the folded position. The infeed chute 16 can be generally rectangular as shown, but can have another shape in other embodiments. The first outer dimension D1 may be the same or larger than the maximum width WC of the infeed chute 16. In the illustrated embodiment, the first outer dimension D1 is larger than the second outer dimension D2 and the third outer dimension D3. In the illustrated embodiment, D1 is defined by the distance between a control 53 located on one side of the infeed chute 16 and a control 53 located on another side of the infeed chute 16. In general, the first outer dimension D1 is the larger of height (measured parallel to the vertical plane VP) or width (measured perpendicular to the vertical plane VP), as measured between the outermost components of the infeed chute 16. As described further below, the infeed chute 16 is reconfigurable to change whether the first outer dimension D1 extends in the width direction perpendicular to the vertical plane VP or in the height direction parallel to the vertical plane VP. In other words, as viewed longitudinally along the longitudinal axis LA or the feed axis FA, the orientation of the first outer dimension D1 can be changed. In some embodiments, the first outer dimension D1 may be defined by the span of the control bar 55. In some embodiments, the first outer dimension D1 may be defined by the maximum distance between the first side 38 and the second side 40 of the infeed chute 16 or the distance between the first side 76 and the second side 78 of the foldable portion 70. In some embodiments, the first outer dimension D1 may be defined by the span of the feed table 34 or the span of the bottom surface 74.

The second outer dimension D2 (when unfolded) and the third outer dimension D3 (when folded) are measured perpendicular to the first outer dimension D1 (i.e., the other of height or width). As with the first outer dimension D1, the second outer dimension D2 (or third outer dimension D3) can be defined between outermost components of the infeed chute 16. The second outer dimension D2 (or third outer dimension D3) extends in either the width direction or the height direction, depending on the configuration of the infeed chute 16. In the illustrated embodiment, the second outer dimension D2 is defined by the distance between the control bar 55 and the protective bar 41. In other embodiments, the second outer dimension D2 may be defined by the distance between the feed table 34 and the top portion 44 or the distance between the bottom surface 74 and the top portion 44. In other embodiments, the second outer dimension D2 may be defined as the total span of the side surfaces 38, 40 of the infeed chute 16 or the total span of the side surfaces 76, 78 of the foldable portion 70. The third outer dimension D3 is smaller than the second outer dimension D2. The third outer dimension D3 may be the same or larger than the maximum height HC. In the illustrated embodiment, the third outer dimension D3 is defined as the distance between the hinges 72 and the protective bar 41. In other embodiments, the third outer dimension D3 may be defined as the distance between the protective bar 41 and the feed table 34. In other embodiments, the third outer dimension D3 may be defined as the span of the side surface 38, 40.

Additionally, a detailed description of an infeed portion that may be similar to the infeed portion 25 is provided in U.S. Pat. No. 8,567,706 of Vermeer Mfg. Co., the entire contents of which are incorporated by reference herein.

The processing portion 27 (FIG. 8) is disposed between the infeed portion 25 and the discharge portion 20 and processes the material 5 into smaller pieces. The processing portion 27 may be coupled directly or indirectly to the infeed portion 25. The processing portion 27 includes a rotatable cutting mechanism 26 such as a chipping or cutting drum or a disk cutter. In the illustrated embodiment, the cutting mechanism 26 is a disk cutter. The cutting mechanism 26 can be directly driven (power transfer without clutches) or indirectly driven (power transfer with clutches) by the prime mover system 28. The cutting mechanism 26 is configured to receive the material 5 from the infeed portion 25 and perform a cutting operation (e.g., a chipping action). The controller 56 can control the cutting operation of the cutting mechanism 26.

Cutting mechanisms are well known, and any appropriate cutting mechanism (whether now known or later developed) may be used to process the material 5 into smaller pieces. A detailed description of a processing portion that may be similar to the processing portion 27 is provided in U.S. Pat. No. 8,317,117 of Vermeer Mfg. Co., the entire contents of which are incorporated herein by reference.

The reduced (e.g., chipped) material 5 (FIGS. 1 and 8) is discharged through the discharge portion 20. The discharge portion 20 may include a curved discharge chute 22. The discharge chute 22 can be rotated (e.g., about a vertical axis DA) between a plurality of orientations to control the location of the discharged material. The discharge chute 22 includes a rotation assembly 73 that allows the discharge chute 22 to rotate in a sweeping manner about the vertical axis DA. In a chipping configuration the position of the discharge chute 22, specifically the position of the discharge end 77, may be rotated such that chips are discharged in the desired direction. In a transport configuration, the discharge chute 22 may be rotated such that the discharge end 77 is within a maximum body width WB of the main portion of the brush chipper 10 (e.g., the width of the brush chipper 10 excluding the infeed chute 16). This is shown in at least FIG. 5. The operator can control the rotational position of discharge chute 22 through a handle and latch assembly 79 or in some configurations the operator uses controls 53 or remote 54 to send a command to an actuator that causes the discharge chute 22 to rotate to the desired position for chipping or transport.

Figure 10:
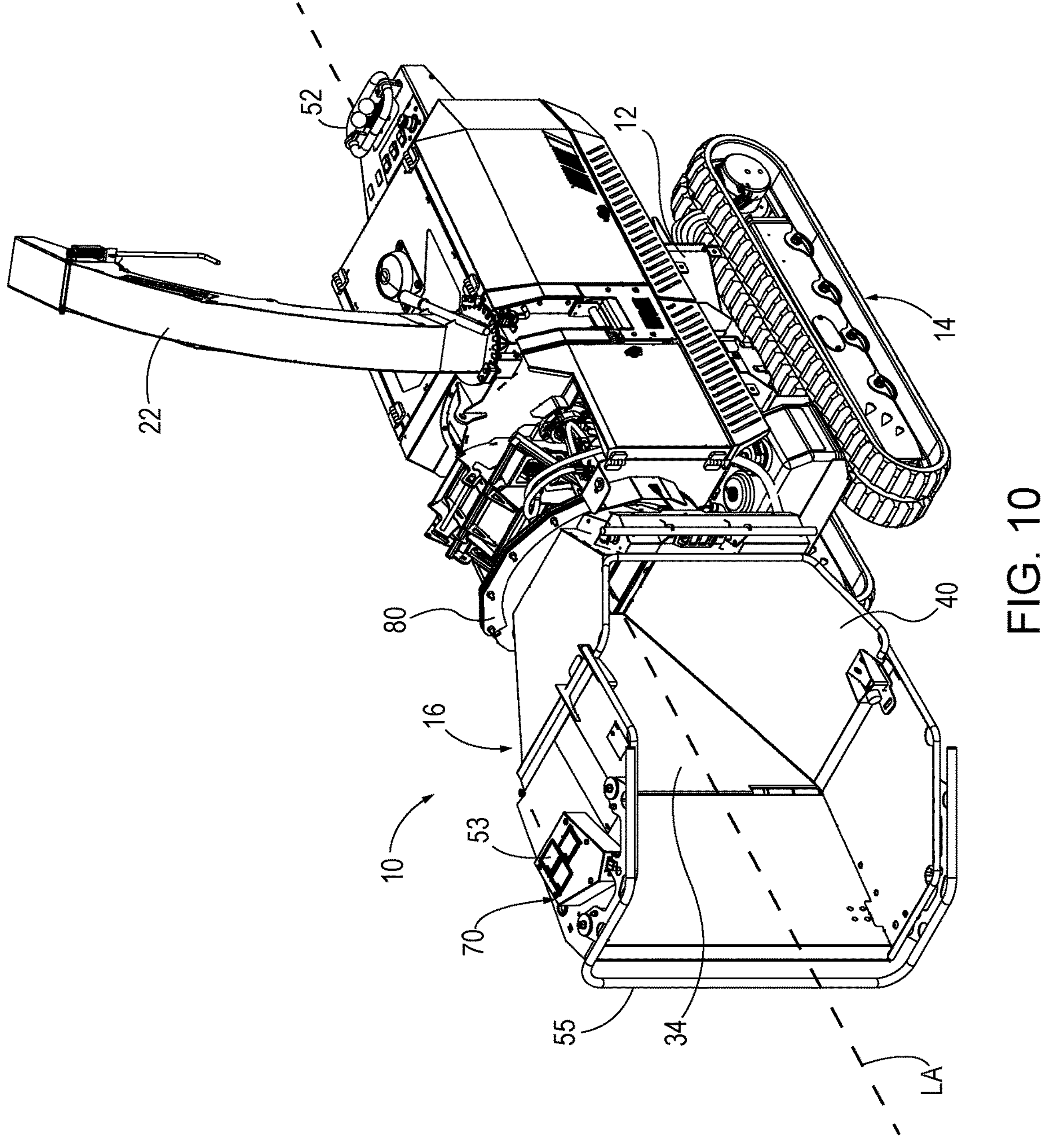
FIG. 10 is a rear perspective view of the chipper of FIG. 1 in a rotated position.
Figure 11:
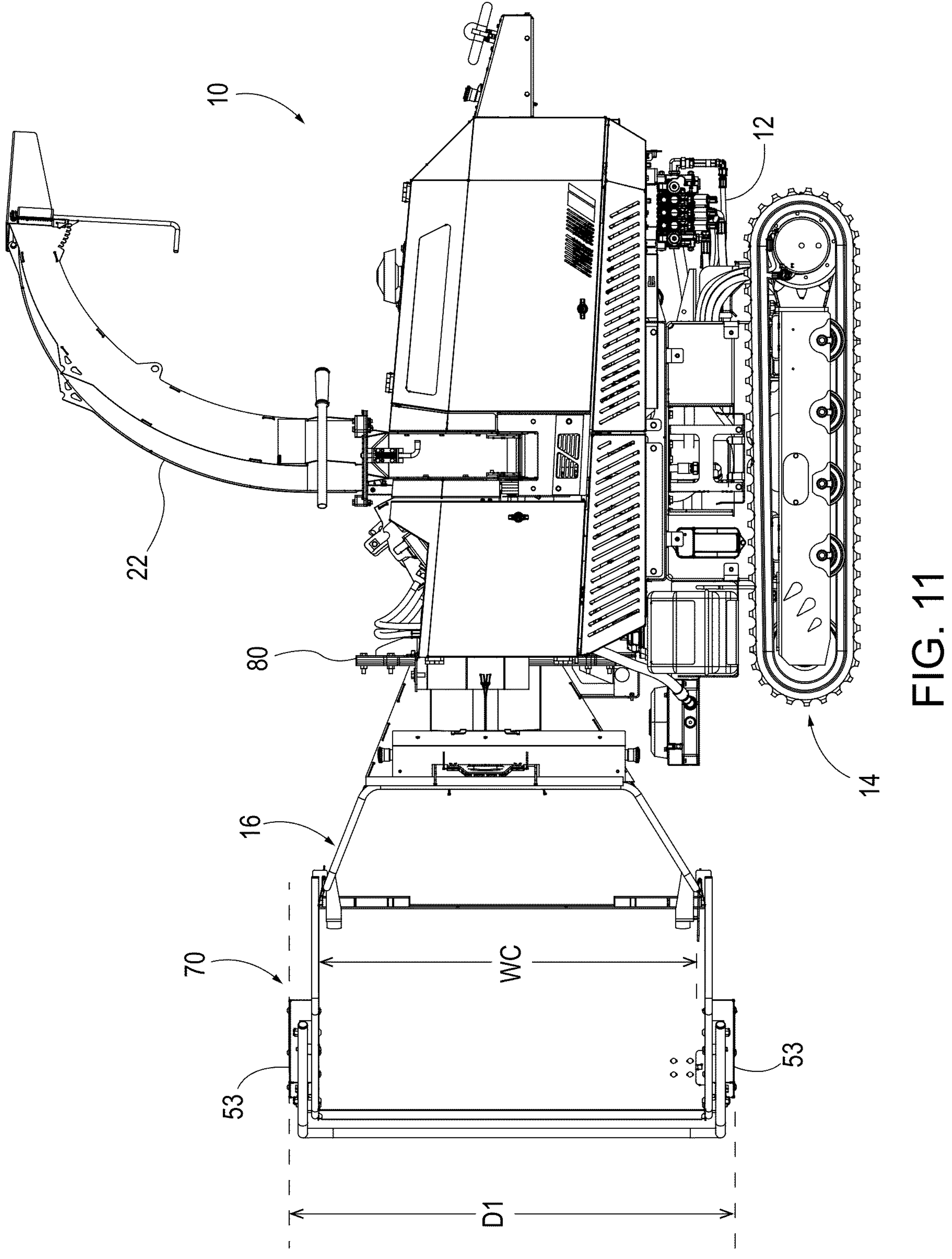
FIG. 11 is a side view of the chipper of FIG. 10.

The brush chipper 10 includes a rotation assembly 80 that allows the infeed chute 16 to rotate between a chipping configuration (e.g., an operational configuration) and a transport configuration, which may be a non-operational configuration for transport only. More specifically, the infeed chute 16 is rotationally mounted to the brush chipper 10 via the rotation assembly 80 such that the infeed chute 16 is rotatable about an axis that is parallel to the feed axis FA. More specifically, the infeed chute 16 is rotatable about a longitudinal axis LA (FIG. 10). In the illustrated embodiment, the longitudinal axis LA is parallel to and offset from the feed axis FA. In an alternate example of a longitudinal axis LA that is parallel to the feed axis FA, the feed axis FA and the longitudinal axis LA may be coaxial (i.e., parallel with zero offset). According to the illustrated embodiment, the feed axis FA and the longitudinal axis LA are horizontal. The rotation assembly 80 is positioned between the infeed chute 16 and a main portion of the brush chipper 10. The main portion of the brush chipper 10 may include the part of the infeed portion 25 with the infeed rollers 18, the processing portion 27, the discharge portion 20, and the controller 56. The infeed chute 16 is rotatable in a clockwise direction and a counterclockwise direction about the longitudinal axis LA. More specifically, when observed from the wide end 132 of the infeed chute 16, the infeed chute 16 rotates in the clockwise direction from the chipping position to the transport position and rotates in the counterclockwise direction from the transport position to the clockwise direction. In other embodiments, the infeed chute 16 may rotate in the counterclockwise direction from the chipping position to the transport position and may rotate in the clockwise direction from the transport position to the chipping position.

Figure 9:
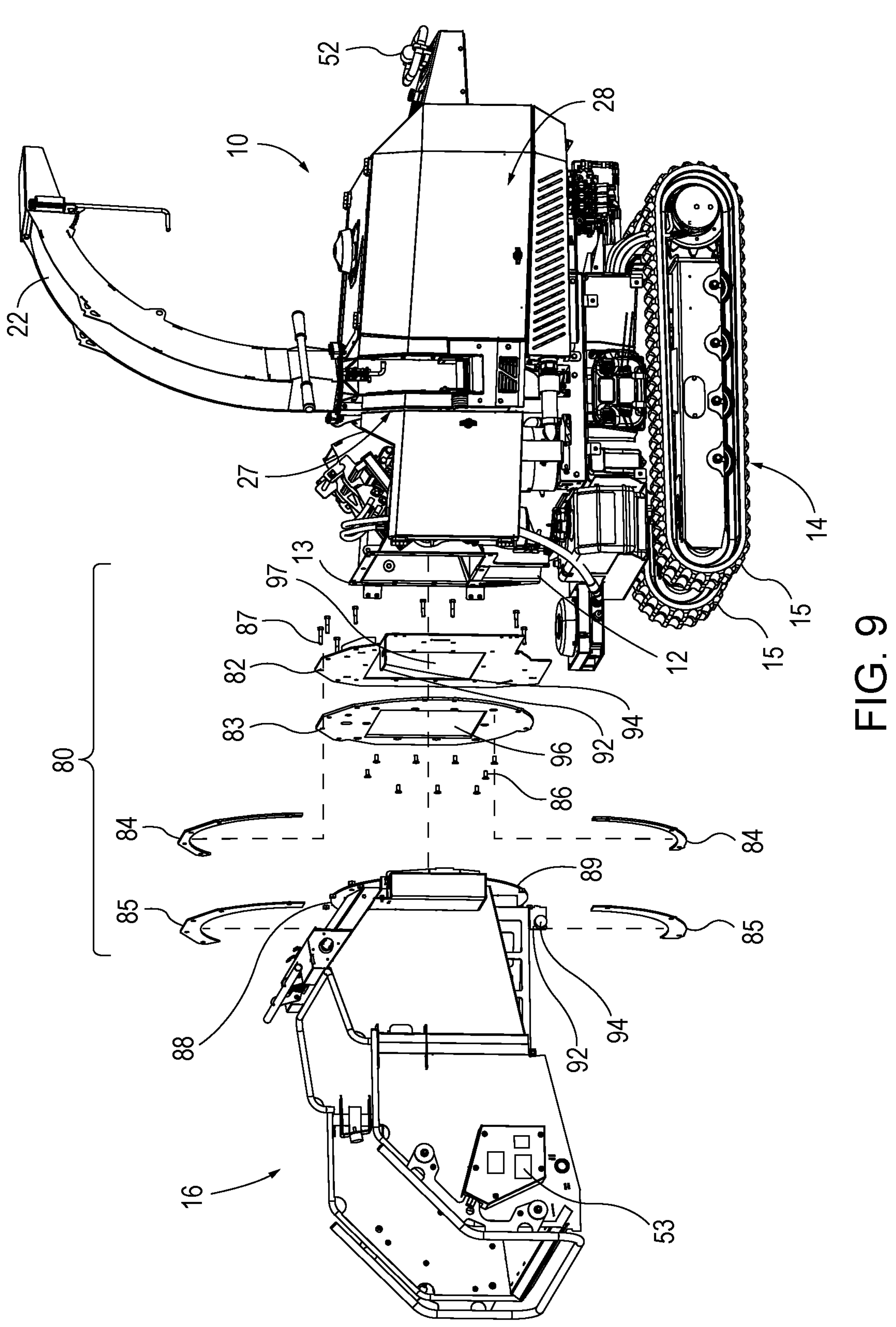
FIG. 9 is an exploded view of the infeed chute rotation assembly of the chipper of FIG. 1.

With reference to FIG. 9, the rotation assembly 80 includes a backplate 83 and a mounting plate 82 secured to a mounting flange 13 by fasteners 86. The mounting flange 13 may be a portion of the frame 12 or a portion of the processing portion 27. The backplate 83 may provide a bearing and wear surface during rotation. The infeed chute 16, more specifically, a flange 89 disposed on the narrow end 30 of the infeed chute 16, is positioned against the backplate 83. The flange 89 serves as a joint between the infeed chute 16 and the main body of the brush chipper 10. A set of spacers 84 are positioned against the backplate 83 and outside the periphery of the flange 89. The set of spacers 84 have a curved shape, more specifically, the set of spacers 84 define a semicircular shape. The rotation assembly 80 also includes locking rings 85 that are positioned against the set of spacers 84. The locking rings 85 have a shape similar to the set of spacers 84. The set of spacers 84 create a longitudinal gap between the backplate 83 and the locking rings 85. Fasteners secure the locking rings 85, the spacers 84, the mounting plate 82, and the backplate 83 together. In the illustrated embodiment, the fasteners include at least one bolt 87 and at least one nut 88.

Figure 23:
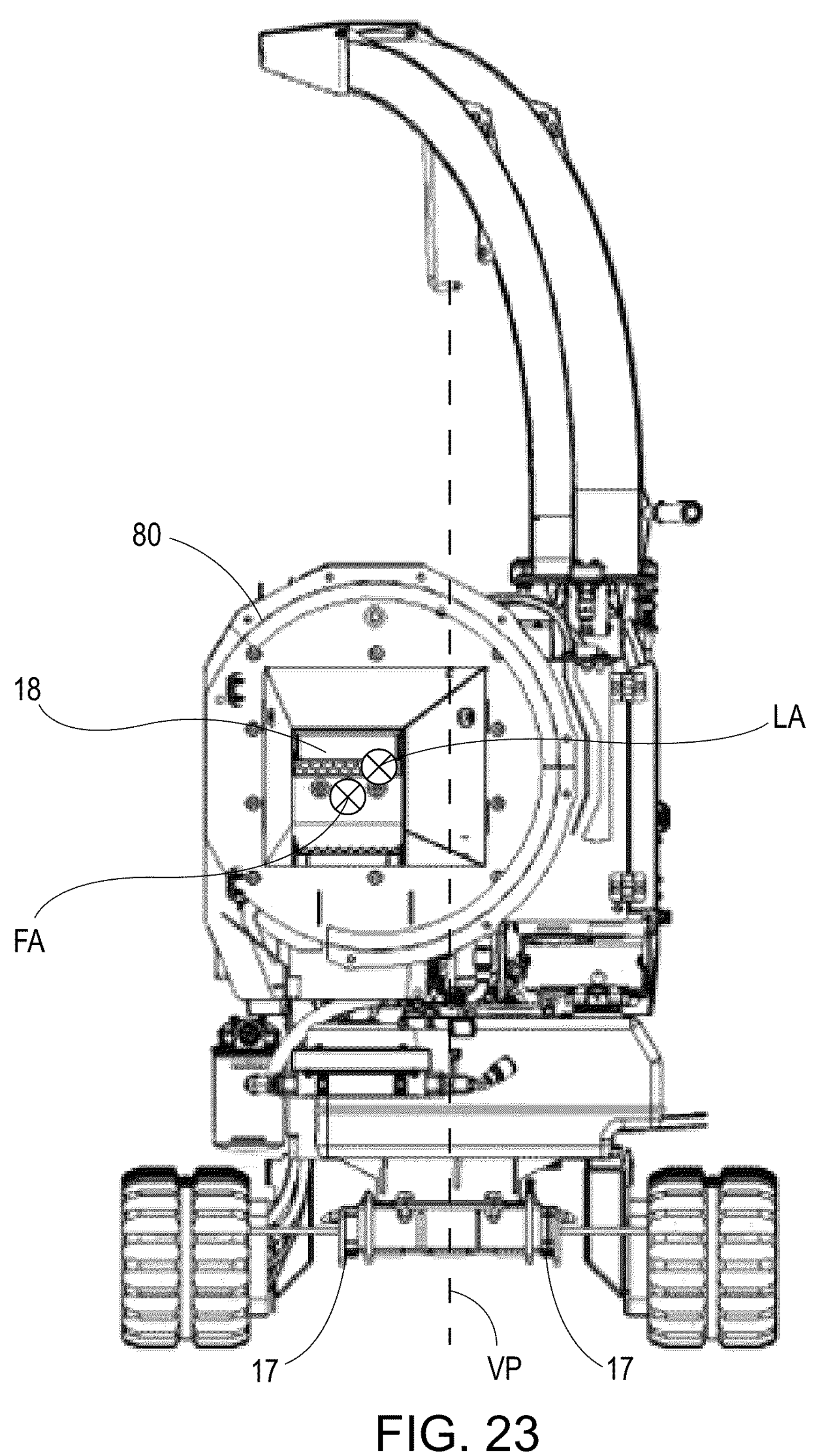
FIG. 23 is a rear view of the chipper of FIG. 2 with the infeed chute removed.

The flange 89 of the infeed chute 16 is positioned and restrained within the longitudinal gap between the backplate 83 and the locking rings 85. The backplate 83 and the locking rings 85 at least partially encircle the flange 89. The longitudinal gap is greater than or equal to the thickness of the flange 89 to avoid pinching/compressing of the flange 89 when the rotation assembly 80 is assembled. In turn, the thickness of the spacers 84 is equal to or greater than the thickness of the flange 89. The circular profile of the flange 89 and the corresponding longitudinal gap allows the rotation of the infeed chute 16 about the longitudinal axis LA (FIG. 23). The configuration of the spacers 84 and the locking rings 85 may allow the rotation of the infeed chute 16. The infeed chute 16 may have a rotation range of 75 to 100 degrees about the longitudinal axis LA. More specifically, the infeed chute 16 may be rotatable 90 degrees about the longitudinal axis LA.

The flange 89 defines a first opening (not shown), the backplate 83 defines a second opening 96, and the mounting plate 82 defines a third opening 97. The openings 96, 97 may be centered on or offset from the longitudinal axis LA. The feed axis FA runs through the openings 96, 97. The openings 96, 97 allow the material 5 to pass from the infeed chute 16 to the main portion.

The rotation assembly 80 may include stops 92 located on the infeed chute 16 and the frame 12. The stops 92 are configured to be rotational travel limits. More specifically, the stops 92 are configured to limit the rotation of the infeed chute 16 to a prescribed range (e.g., 90 degrees). The stops 92 may be formed as flanges, rubber stops, or similar cushions to dampen the impact when the rotation limit is reached.

In some embodiments, the stops 92 can optionally integrate one or more securing elements that can secure, lock, or maintain the rotational position of the infeed chute 16 and prevent inadvertent rotational motion of the infeed chute 16. The securing element may be a bolt. In some embodiments, the securing element may be a spring biased pin with a handle, a chute latch, or a clamp disposed on the rotation assembly 80. In some embodiments, the securing elements may be provided elsewhere on the brush chipper 10 (e.g., on the infeed chute 16 or the main body) separate from the stops 92.

The securing element may have a sensor to determine if the securing element is in a locked or unlocked position. The securing element sensor may be connected to the controller 56. The controller 56 may limit functions of the brush chipper 10 depending upon the sensed location of the securing element. If the securing element is in an unlocked position, the infeed portion 25, the processing portion 27, and/or the ground drive system 14 may be disabled. Conversely, if the securing element is locked, the controller 56 may allow the operation of the infeed portion 25, processing portion 27, and/or ground drive 14.

In the illustrated embodiment, the rotation assembly 80 is manually actuated, such that the operator manually rotates the infeed chute 16 between the chipping position and the transport position. In alternative embodiments, the rotation assembly 80 may include an actuator (not shown), such as an electric or hydraulic motor, configured to drive the rotation of the infeed chute 16 between the chipping and transport positions.

In FIGS. 1-8, the brush chipper 10 is in the chipping configuration with the foldable portion 70 in the unfolded position. When the infeed chute 16 is rotated into the chipping configuration, the feed table 34 is horizontal. In the chipping configuration the feed table 34 is perpendicular to the vertical plane VP and may be below the longitudinal axis LA and the feed axis FA such that the bottom edge 46 extends in a horizontal direction. In the chipping configuration, the first outer direction D1 extends in the horizontal direction and the second outer dimension D2 extends in the vertical direction.

When the infeed chute 16 is in the chipping configuration, the brush chipper 10 has an operational width of W and an unfolded length of L1 (FIG. 5). The operational width W is larger than a maximum body width WB of the main portion of the brush chipper 10 (e.g., the width of the brush chipper 10 excluding the infeed chute 16). The operational width W may be the same length as D1 such that D1 defines the operational width W. In some embodiments, the operational width W may be between 1.0 meter and 1.5 meters. In some embodiments, the operational width W may be 1.25 meters.

The brush chipper 10 is moved from the chipping configuration to a transport configuration (e.g., an unfolded transport configuration or a folded transport configuration), by rotating the infeed chute 16 90 degrees, as illustrated in FIGS. 10-13 and 17-22. Moving the brush chipper 10 from the chipping configuration to the transport configuration decreases the overall width of the brush chipper 10.

Figure 12:
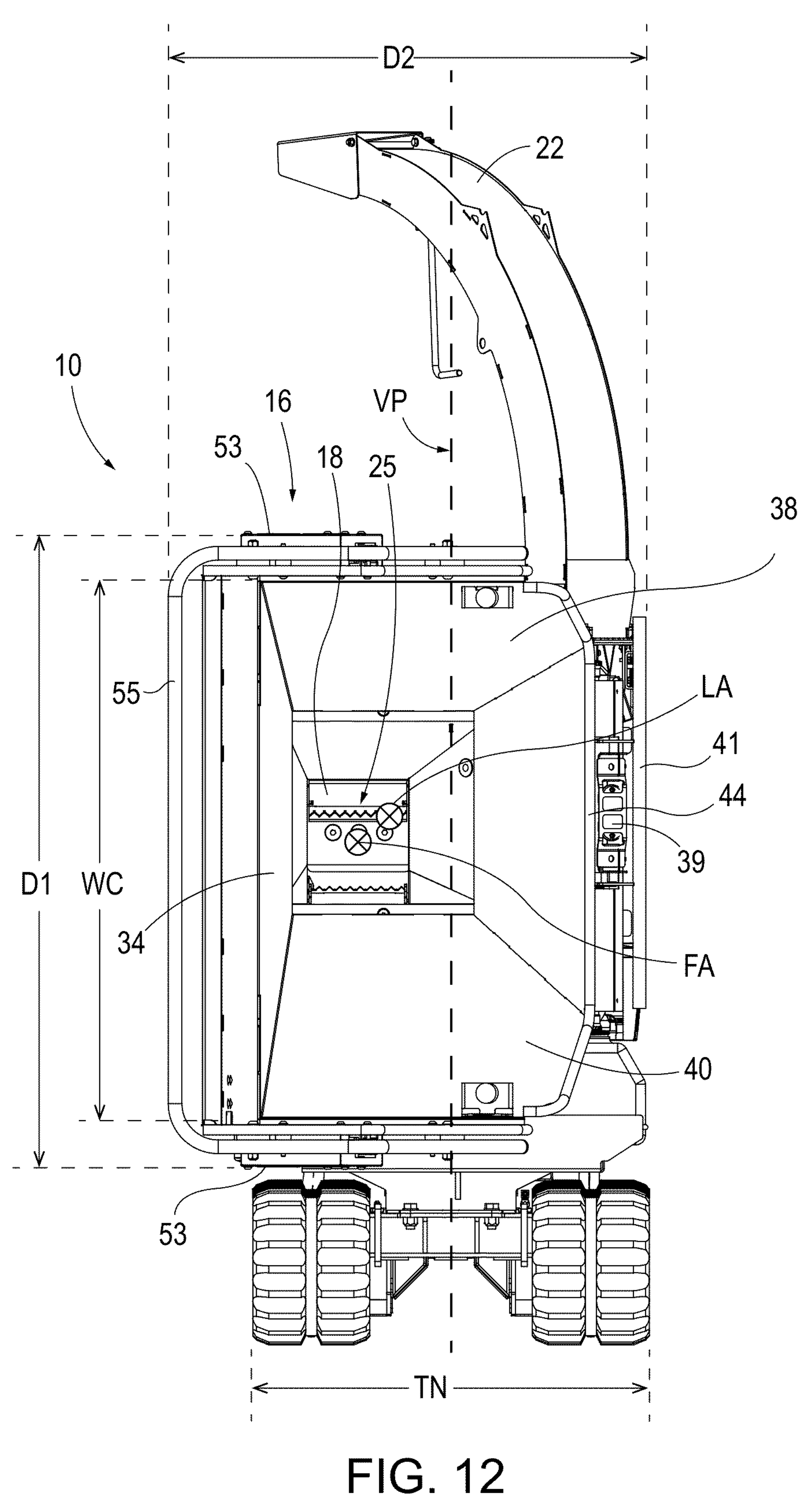
FIG. 12 is a rear view of the chipper of FIG. 10.
Figure 13:
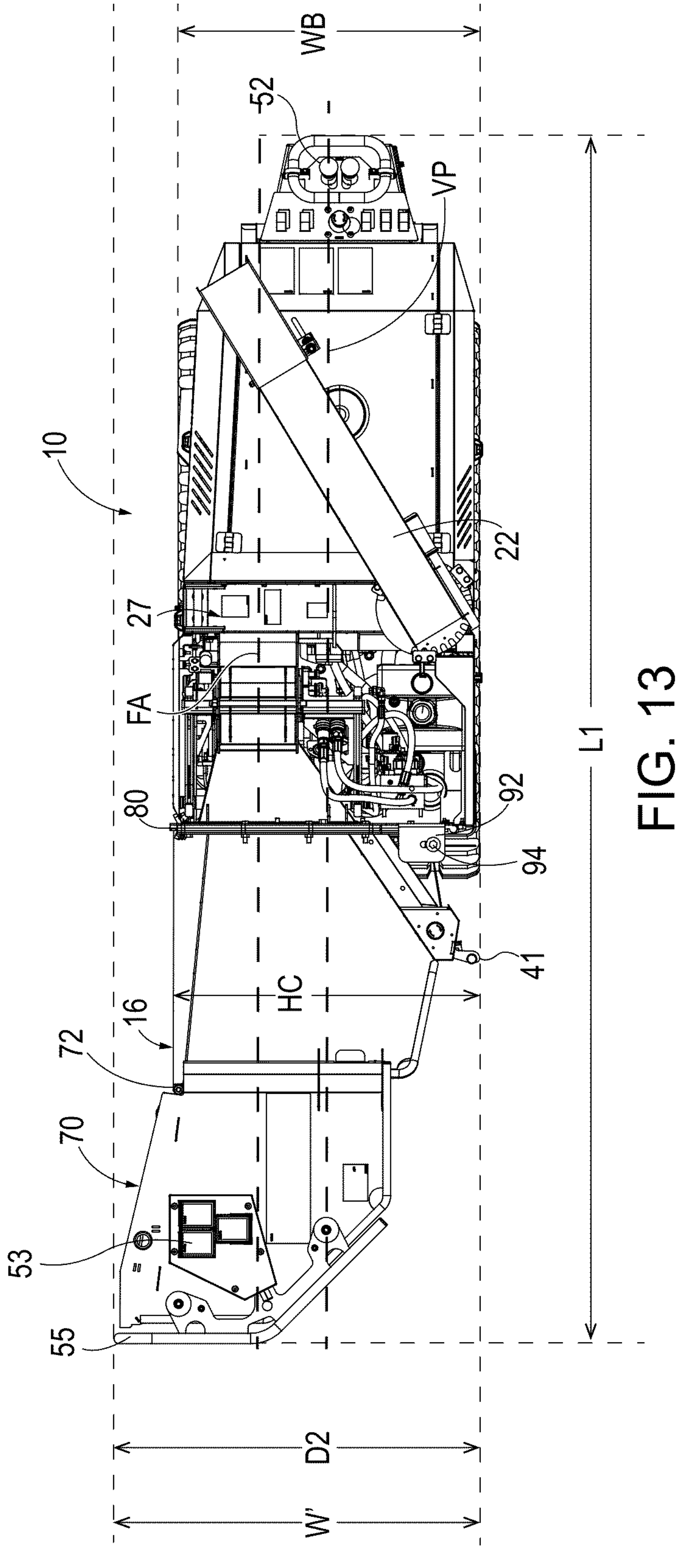
FIG. 13 is a top view of the chipper of FIG. 10.
Figure 14:
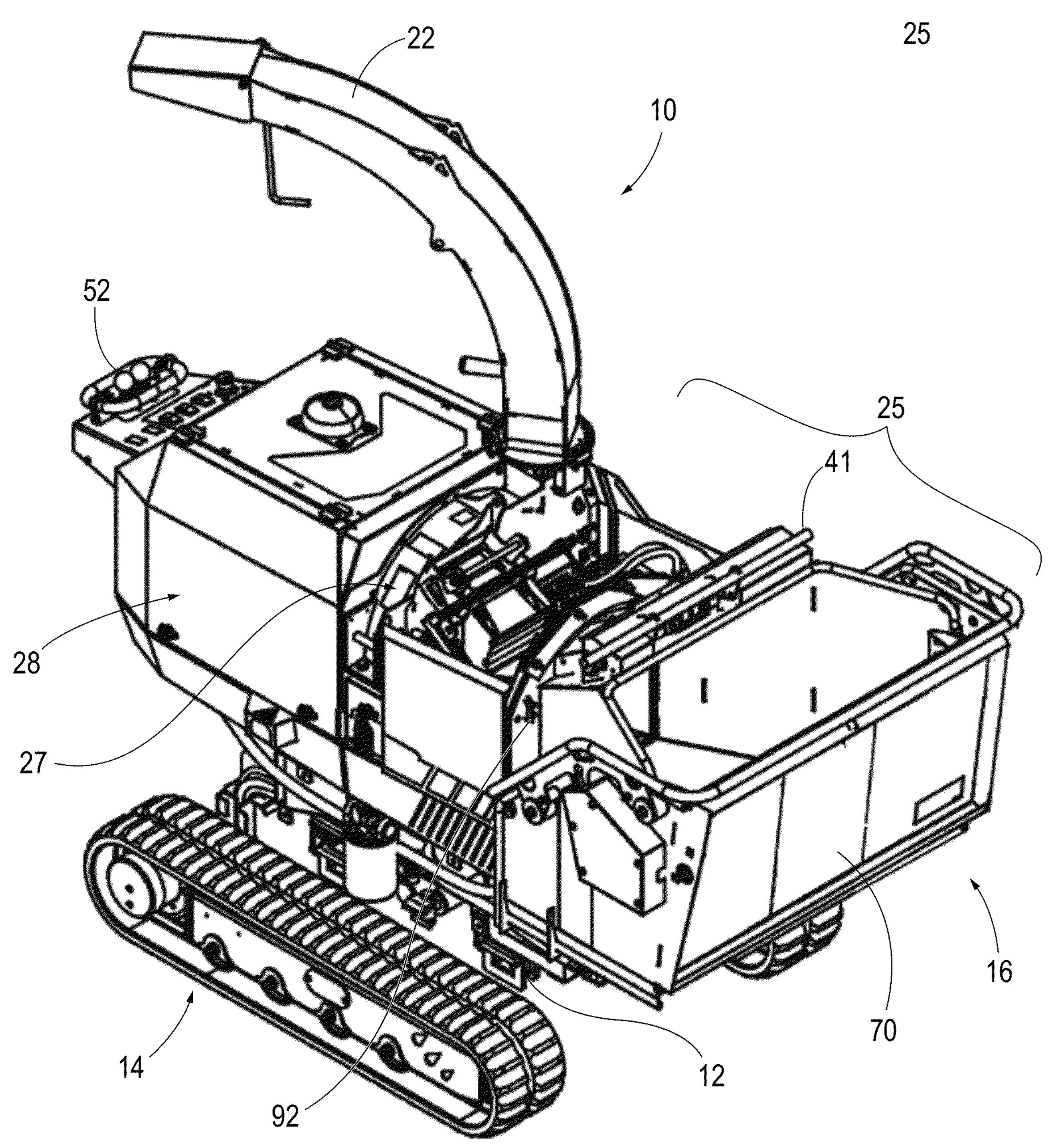
FIG. 14 is a rear perspective view of the chipper of FIG. 1 with a folded infeed chute in the chipping position.

In FIGS. 10-13, the brush chipper 10 is in the unfolded transport configuration and the foldable portion 70 is in the unfolded position. In this configuration, the feed table 34 is laterally alongside the longitudinal axis LA and the feed axis FA. As shown in FIG. 12, the feed table 34 is vertical in this configuration, and thus, the feed table 34 is parallel to the vertical plane VP such that the bottom edge 46 extends in the vertical direction. In the unfolded transport configuration, the first outer dimension D1 extends in the vertical direction and the second outer dimension D2 extends in the horizontal direction D2.

When the infeed chute 16 is in the unfolded transport configuration (FIG. 13), the brush chipper 10 has an unfolded transport width of W' and an unfolded length of L1. The unfolded transport width W' is less than the operational width W. In the illustrated embodiment, the unfolded transport width W' is larger than the maximum body width WB of the main portion of the brush chipper 10, however in other embodiments (e.g., embodiments without the foldable portion 70), the unfolded transport width W' may be less than or equal to the maximum body width WB of the main portion of the brush chipper 10. In embodiments with the foldable portion 70, the unfolded transport width W' may be larger than the height HC. The unfolded transport width W' may be the same as the second outer dimension D2. In some embodiments, the unfolded transport width W' may be between 0.6 meter and 1.0 meter. In some embodiments, the unfolded transport width W' may be 0.85 meter.

FIGS. 17-22 illustrate the brush chipper 10 in the folded transport configuration with the foldable portion 70 in the folded position. In the folded transport configuration, the first outer dimension D1 extends vertically and the third outer dimension D3 extends horizontally.

Figure 22:
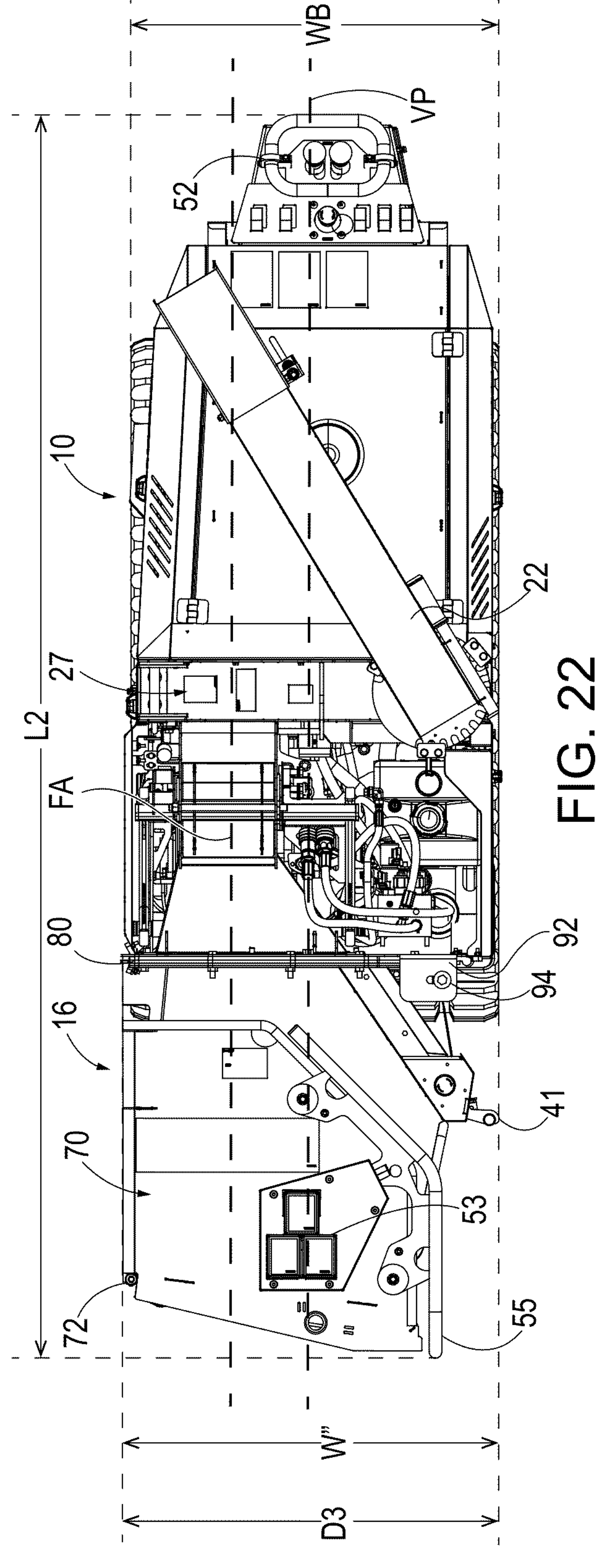
FIG. 22 is a top view of the chipper of FIG. 17.

In the folded transport configuration, the brush chipper 10 has a folded transport width of W" and a folded length of L2 (FIG. 22). The folded transport width W" may be equal to or less than the width maximum body WB of the main portion of the brush chipper. In the illustrated embodiment, the folded transport width W" is the same as the maximum body width WB of the main portion of the brush chipper 10. The folded transport width W" may be the same as D3 such that D3 is the minimum overall width of the brush chipper 10. In some embodiments, the folded transport width W" may be larger than the maximum body width WB of the main portion of the brush chipper 10. The folded length L2 is less than the unfolded length L1.

The folded transport width W" of the brush chipper 10 is smaller than the unfolded transport width W' and the operational width W of the brush chipper 10. The folded transport width W" may be 55% to 75% of the operational width. In one embodiment, the folded transport width W" is 68% of the operational width W. The folded transport width W" may be smaller than the operational width W by 0.4 to 0.6 meter. In one embodiment, the folded transport width W" is 0.6 meter smaller than the operational width W. The folded transport width W" may be 0.75 meter to 1.0 meter. In one embodiment, the folded transport width W" is 0.85 meter.

Figure 3:
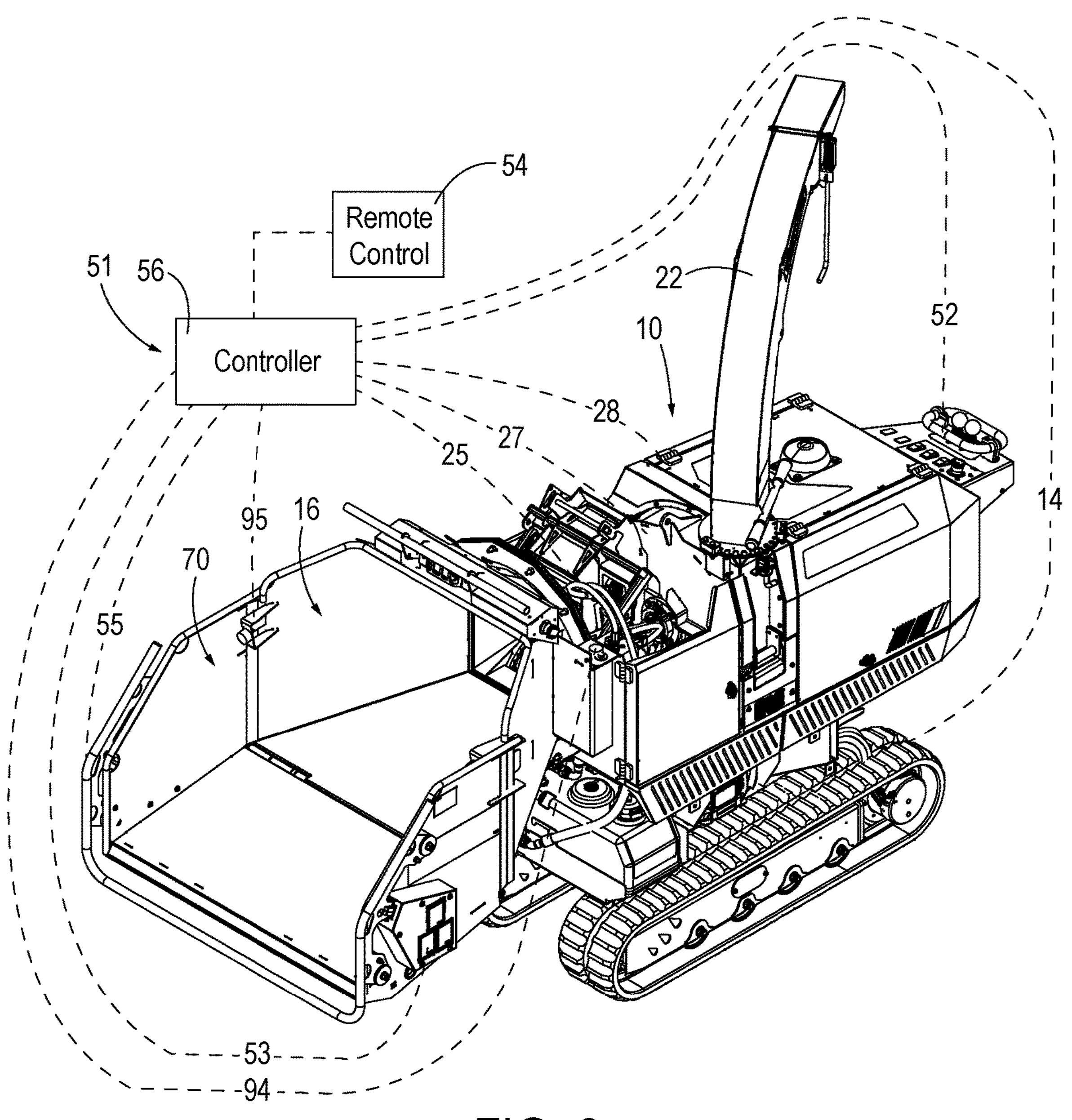
FIG. 3 is an additional rear perspective view of the chipper of FIG. 2.

The brush chipper 10 may also include a position sensor 94 (FIG. 3). The position sensor 94 is operable to sense or detect the rotational position of the infeed chute 16. The position sensor 94 may be connected to the controller 56 of the control system 51. The controller 56 may limit the functionality of the brush chipper 10 depending on the sensed position of the infeed chute 16. For example, if the position sensor 94 indicates that the infeed chute 16 is in the transport position, the functionality of one or both of the infeed portion 25 and the processing portion 27 may be disabled (e.g., the cutting mechanism 26 is prevented from performing the cutting action) according to the programmed algorithm of the controller 56. Conversely, if the position sensor 94 indicates that the infeed chute 16 is in the chipping position, the functionality of the infeed portion 25 and the processing portion 27 may be enabled by the controller 56 such that the operator may commence the chipping operation. The controller 56 may also limit the ground drive 14 depending on the rotational position of the infeed chute 16, for example, when the infeed chute 16 is in the chipping position, the controller 56 may disable movement of the ground drive 14. The position sensor 94 may be a proximity sensor or a rotary potentiometer. In some embodiments, the position sensor 94 may be a limit switch that only determines if the brush chipper 10 is in the chipping position or if the brush chipper 10 is not in the chipping position. Alternatively, the position sensor 94 may be an absolute sensor that determines the rotational position of the infeed chute 16 in the chipping position, the transport position, and anywhere in between.

In configurations where the infeed chute 16 has a foldable portion 70, a fold sensor 95 may sense the position of the foldable portion 70. The fold sensor 95 may be connected to the controller 56. The fold sensor 95 and the controller 56 may be configured to have similar functionality limitations of the brush chipper 10 based upon the sensed position of the foldable portion 70. For example, if the fold sensor 95 indicates that the foldable portion 70 is in the folded position, the functionality of the infeed portion 25 and the processing portion 27 may be disabled by the controller 56.

In some embodiments, the stops 92 (FIG. 2) of the rotation assembly 80 can optionally integrate one or more securing elements that can secure or lock the infeed chute 16 in the chipping configuration or the transport configuration and prevent inadvertent rotational motion of the infeed chute 16. The securing element may be a bolt. In some embodiments, the securing element may be a spring biased pin with a handle, a chute latch, or a clamp disposed on the rotation assembly 80. In some embodiments, the securing elements can be provided elsewhere on the brush chipper 10.

The securing element may have a sensor to determine if the securing element is in a locked or unlocked position. The securing element sensor may be connected to the controller 56. The controller 56 may limit functions of the brush chipper 10 depending upon the sensed location of the securing element. If the securing element is in an unlocked position, the infeed portion 25, the processing portion 27, and/or the ground drive system 14 may be disabled. Conversely, if the securing element is locked, the controller 56 may allow the operation of the infeed portion 25, processing portion 27, and/or ground drive 14.

FIGS. 24-27 illustrate a material reduction machine, such as the brush chipper 110 according to another embodiment. The brush chipper 110 is similar to the brush chipper 10, but the brush chipper 110 includes an infeed chute 116 situated on top of a main portion of the infeed portion 125 and/or the processing portion 127, rather than at the rear end as in the brush chipper 10 of FIGS. 1-23. As such, the infeed chute 116 directs material into the chipper 110 along a direction that is at least predominantly vertical. In some constructions, material can be fed at least partially by gravity. As such, power draw from active feeding such as the rollers 18 of FIG. 8 may be reduced or eliminated in at least some operating conditions. In some constructions, as shown, the infeed chute 116 defines a vertical feed axis FA' compared to the horizontal infeed chute 16 and the horizontal feed axis FA of the brush chipper 10. Many of the components of the brush chipper 110 are similar to the components of the brush chipper 10, such that only the differences will be discussed in detail, while the preceding description and drawings are relied upon for a disclosure of the additional features and alternatives.

The brush chipper 110 includes an infeed portion 125, a processing portion 127, and discharge portion 120. The infeed portion 125 is situated on a rear end of the brush chipper 110.

The infeed portion 125 includes the vertical infeed chute 116. The vertical infeed chute 116 includes a plurality of guide walls. The plurality of guide walls can include a first side 135, a second side 137 opposite the first side 135, a third side 139, and a fourth side 141 opposite the third side 139. The third side 139 and the fourth side 141 may be perpendicular to the first side 135 and second side 137. The first and second side 135, 137 are longer than the third and fourth sides 139, 141. The infeed chute 116 is generally rectangular as shown, but can have another shape in other embodiments.

The side surface 135, 137, 139, 141 include angled surfaces such that the sides form a funnel having a narrow end 130 and a wide end 132. The narrow end 130 is adjacent the main body of the brush chipper 110. The wide end 132 is vertically spaced from the narrow end 130.

The vertical infeed chute 116 defines a first outer dimension D1' and a second outer dimension D2'. The first outer dimension D' is perpendicular to the second outer dimension D2'. The first outer dimension D1' may be defined by the maximum distance between the third and fourth sides 139, 141 or the maximum length of the first and second sides 135, 137. In some embodiments, the vertical infeed chute 116 may include extra components (e.g., controls or a control bar) that increase the length of the first outer dimension D1'.

The second outer dimension D2' may be defined by the maximum distance between the first and second sides 135, 137 or the maximum length of the third and fourth sides 139, 141. In some embodiments, the vertical infeed chute 116 may include extra components (e.g., a control bar or a protective bar) that increase the length of the second outer dimension D2'. The second outer dimension D2' is smaller than the first outer dimension D1'.

The brush chipper 110 includes a vertical feed axis FA'. The feed axis FA' is defined as the axis along which the material passes from the infeed chute 16 toward the processing portion 27 and a cutting mechanism.

Figure 25:
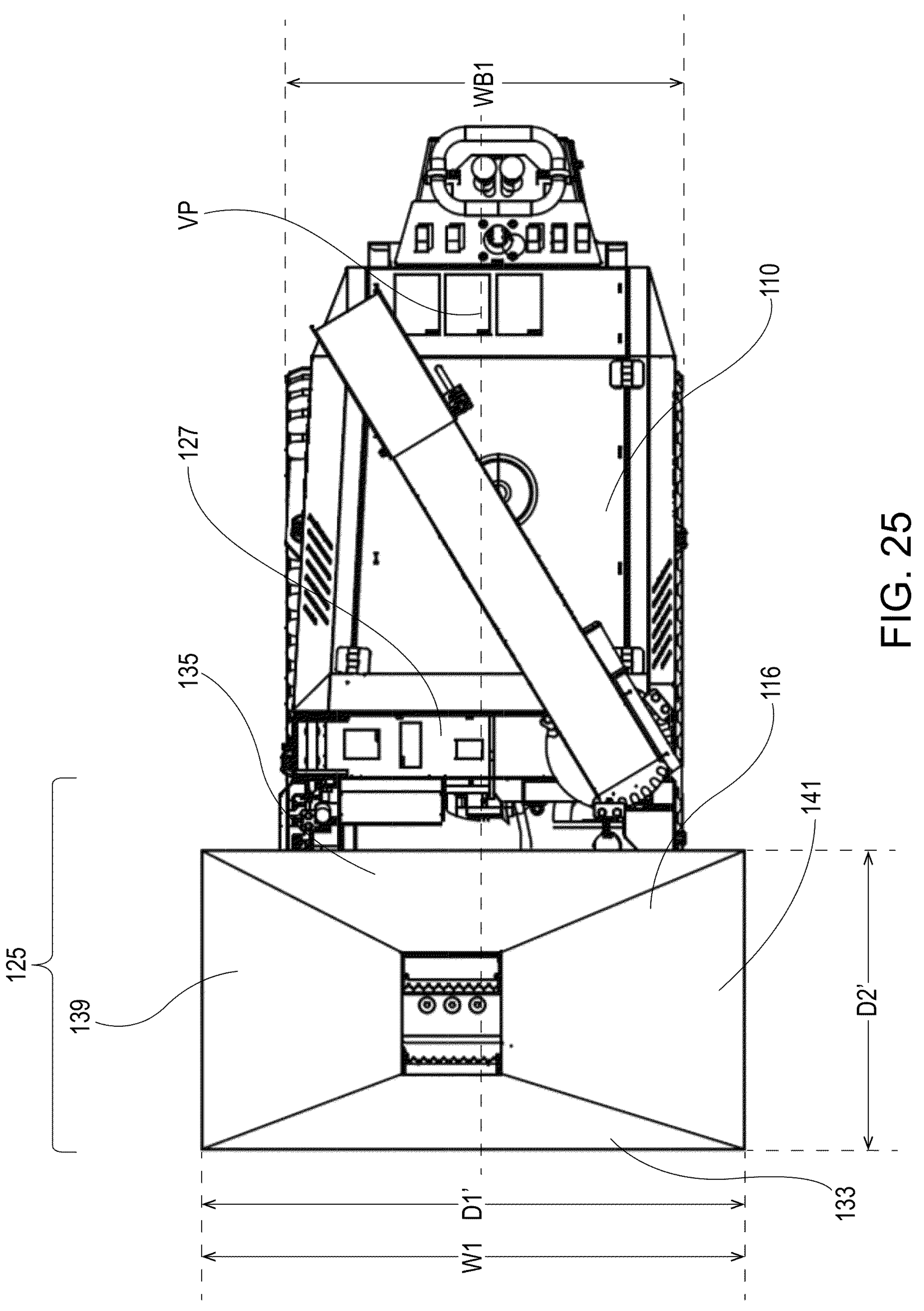
FIG. 25 is a top view of the chipper of FIG. 24.
Figure 26:
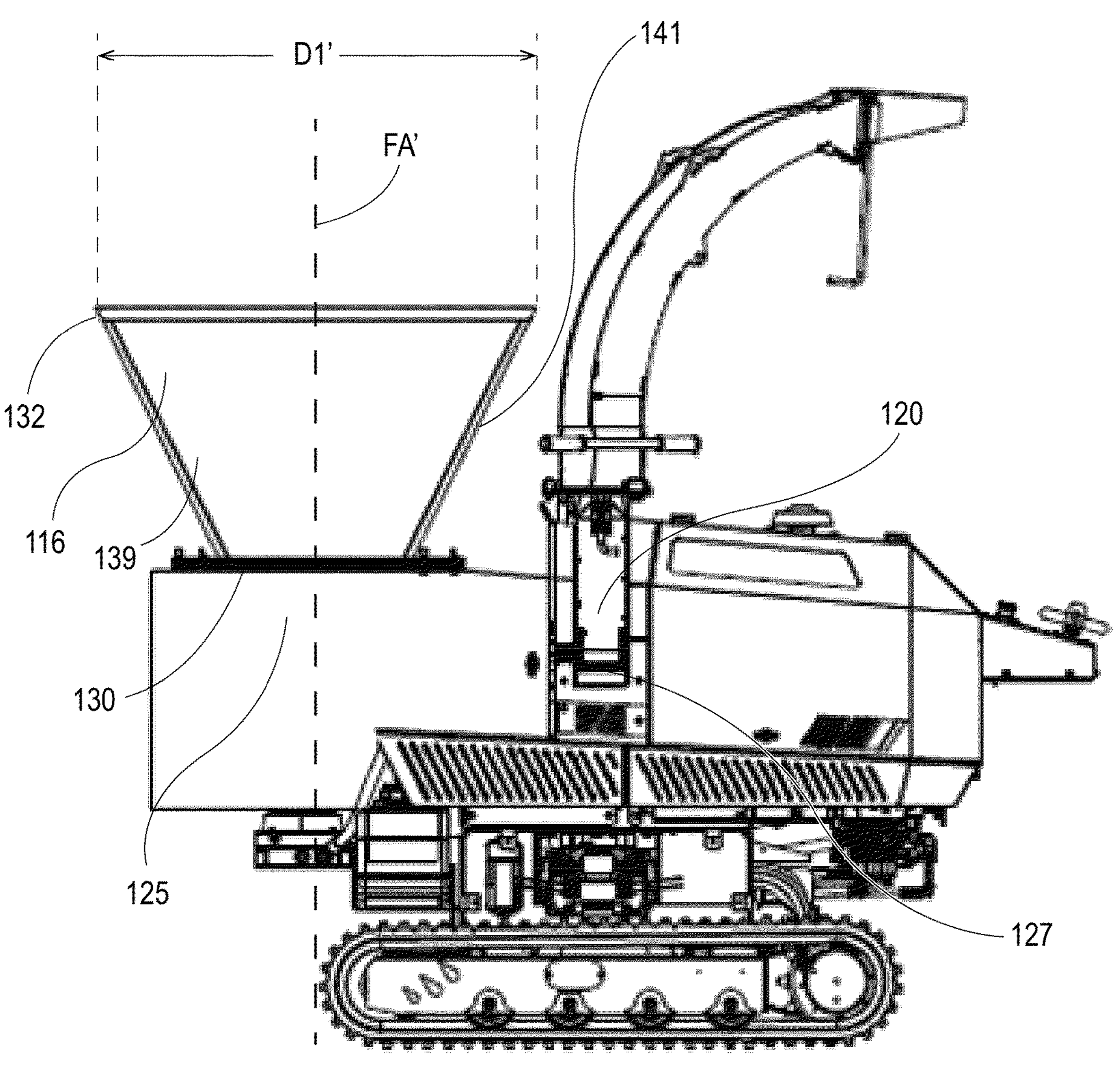
FIG. 26 is a side view of the chipper of FIG. 24 in a rotated position.
Figure 27:
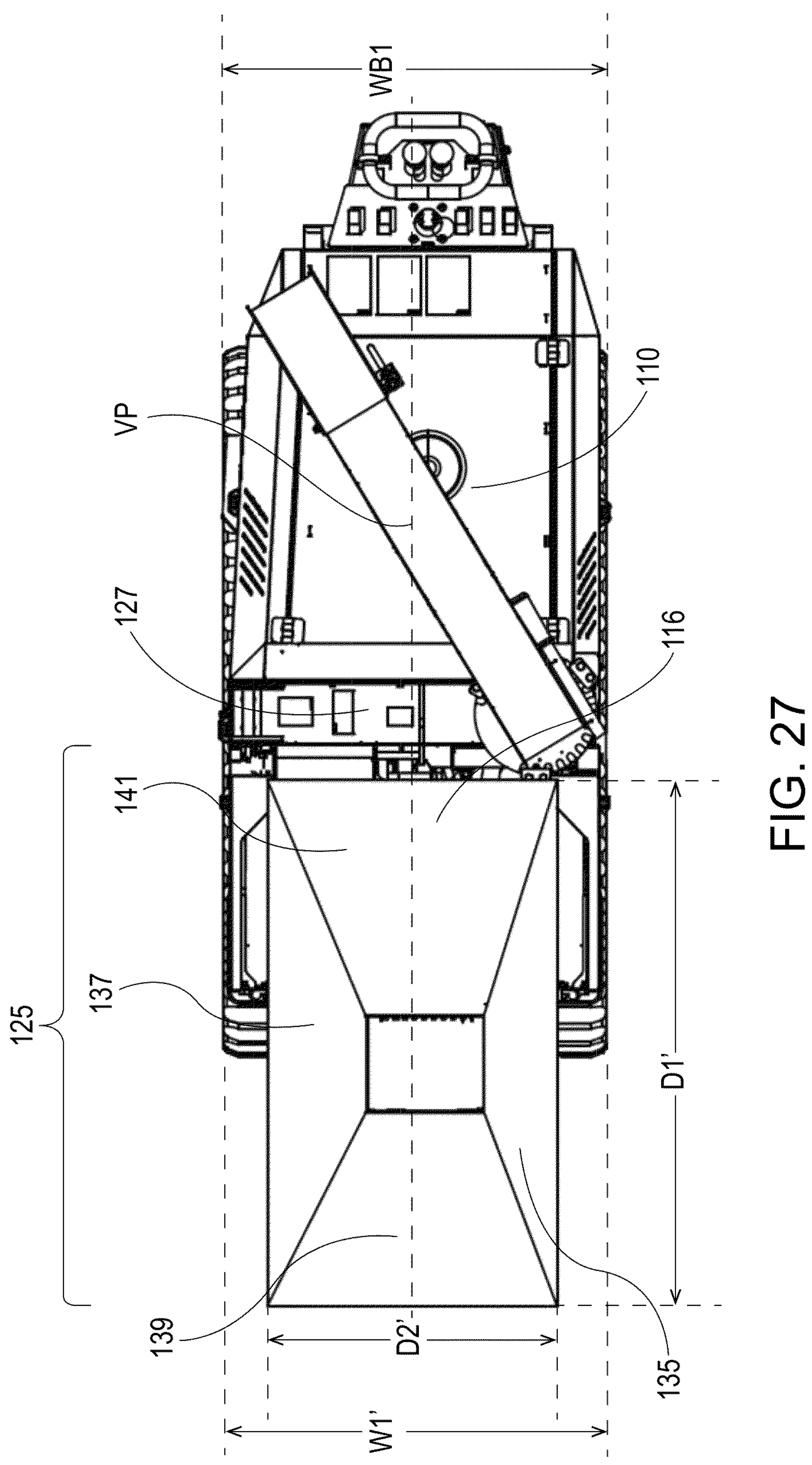
FIG. 27 is a top view of the chipper of FIG. 26.

The brush chipper 110 is rotatable about an axis parallel to the feed axis FA' between a chipping configuration (FIGS. 24-25) and a transport configuration (FIGS. 26-27). In some embodiments, the brush chipper 110 may be rotatable about the feed axis FA'. In such constructions, the transport configuration may be an operational reduced-width chipping configuration. Rotating the brush chipper 110 from the chipping configuration to the transport configuration reduces the overall width of the brush chipper 10.

Figure 24:
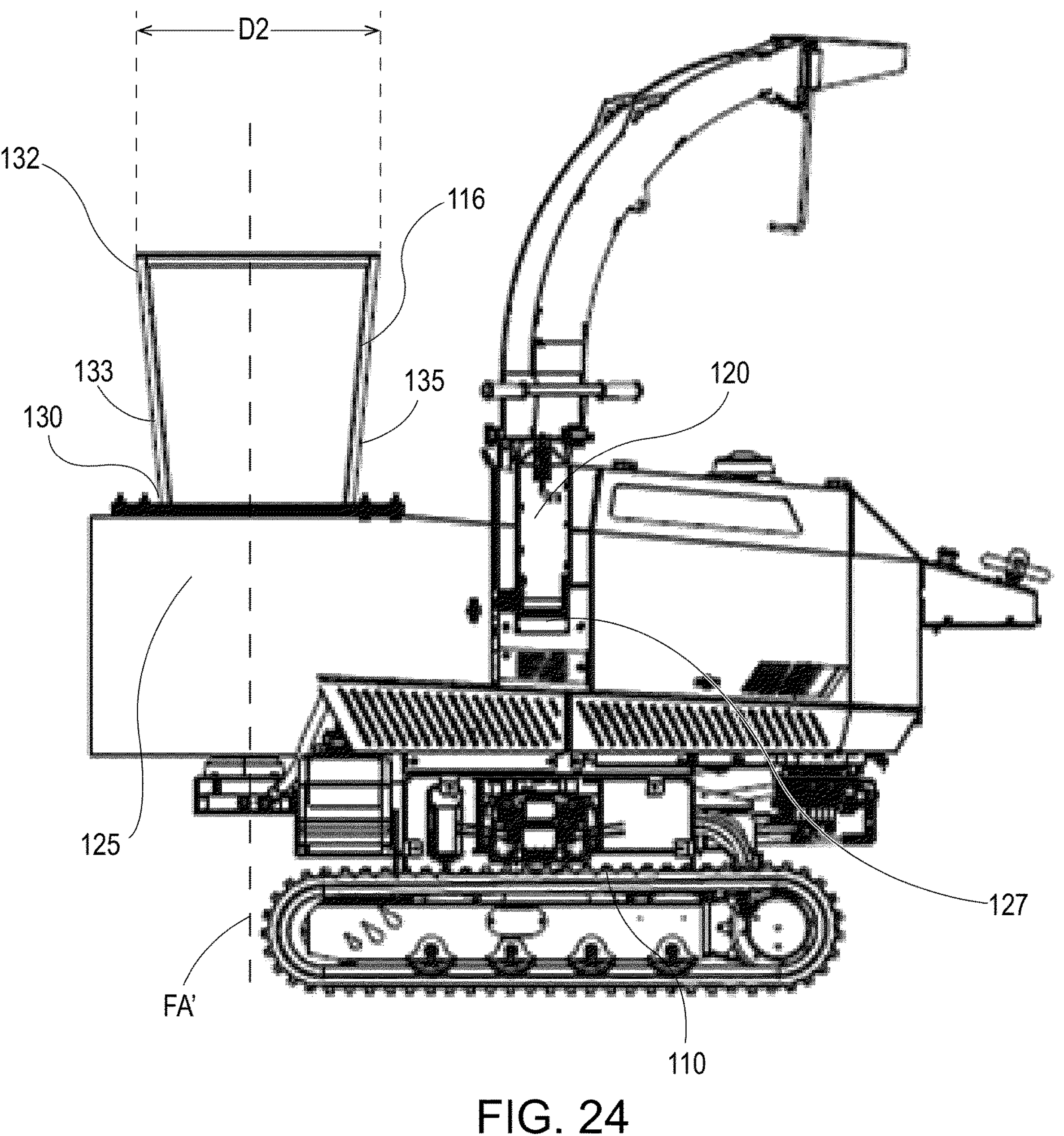
FIG. 24 is a side view of a chipper according to another embodiment of the present disclosure.

In FIGS. 24 and 25, the brush chipper 110 is in the chipping configuration. In the chipping configuration, the first outer dimension D1' extends in the direction of the width of the brush chipper 110 (e.g., measured perpendicular to the vertical plane VP), and the second outer dimension D2' extends in a direction transverse to the width of the brush chipper 110 (e.g., measured parallel to the vertical plane VP). Due to the mounting arrangement of the infeed chute 116 in the illustrated construction, the first and second outer dimensions D1', D2' both extend horizontally in the chipping configuration of FIGS. 24 and 25. The second outer dimension D2' extends in a lengthwise or longitudinal direction of the brush chipper 110 in FIGS. 24 and 25.

When the vertical infeed chute 116 is in the chipping position, the brush chipper 110 has an operational width of W1. The operational width W1 is larger than a maximum body width WB1 of the main portion of the brush chipper 110. The operational width W1 may be the same as the first outer dimension D1' such that the first outer dimension D1' defines the maximum width of the brush chipper 110 when the brush chipper 110 is in the chipping configuration.

In FIGS. 26 and 27, the brush chipper 110 is in the transport configuration. In the transport configuration, the second outer dimension D2' extends in the direction of the width of the brush chipper 110 (e.g., measured perpendicular to the vertical plane VP), and the first outer dimension D1' extends in a direction transverse to the width of the brush chipper 110 (e.g., measured parallel to the vertical plane VP). Due to the mounting arrangement of the infeed chute 116 in the illustrated construction, the first and second outer dimensions D1', D2' both extend horizontally in the transport configuration of FIGS. 26 and 27. The first outer dimension D1' extends in the lengthwise or longitudinal direction of the brush chipper 110 in FIGS. 26 and 27.

When the vertical infeed chute 116 is in the transport position, the brush chipper 110 has a transport width of W1'. The transport width W1' is smaller than the operational width W1. In the illustrated embodiment, the transport width W1' is larger than the second outer dimension D2' and is the same size as the maximum body width WB1 such that the transport width W1' is defined by the main body width WB1. In other embodiments, the second outer dimension D2' may be larger than the maximum body width WB1 such that the transport width W1' is defined by the second outer dimension D2' and not the maximum body width WB1.

In alternative embodiments, not shown, the ground drive 14 may be pivotally attached to the frame 12, allowing the frame 12, and components attached to it, such as the prime mover system 28, the infeed portion 25, the cutting mechanism 26, the discharge chute 22, and the infeed chute 16, to pivot about a vertical axis relative to the tracks 15 (e.g., an axis perpendicular to the feed axis FA). For example, when viewed from the top, a reduction machine mounted on a turntable would allow the open side of infeed chute 16 to be rotated to a position that best suits the needs of the operator, such as to the left, right, or centered—without requiring movement of the ground drive 14. In this embodiment, the frame 12 may be attached to a ground drive subframe by means of a turntable, slewing bearing, or similar. In this embodiment, the infeed chute 16 may be rotatable to a chipping position or transport position, and (optionally) foldable, as disclosed above.

In addition, unless the context of their usage unambiguously indicates otherwise, the articles "a" and "an" should not be interpreted as meaning "one" or "only one." Rather these articles should be interpreted as meaning "at least one" or "one or more."

Although certain embodiments, examples, features, and aspects have been described and illustrated, variations and modifications exist within the scope and spirit of the subject matter explained and shown.

What is claimed is:

1. A material reduction machine comprising:

an infeed chute, the infeed chute having a plurality of guide walls;

a processing portion coupled to the infeed chute, the processing portion having a rotatable cutting mechanism configured to receive material from the infeed chute along a feed axis, wherein the infeed chute is rotatable relative to the processing portion about an axis parallel to the feed axis between an operational configuration and a transport configuration;

further comprising a controller configured to control the rotatable cutting mechanism and a sensor configured to determine if the infeed chute is in the operational configuration, wherein the controller is configured to prevent operation of the rotatable cutting mechanism when the infeed chute is not in the operational configuration.

2. The material reduction machine of claim 1, further comprising a rotational bearing encircling a joint between the infeed chute and a main portion of the material reduction machine containing the processing portion.

3. The material reduction machine of claim 1, wherein the infeed chute is lockable in the operational configuration and lockable in the transport configuration.

4. The material reduction machine of claim 1, wherein one of the plurality of guide walls of the infeed chute is a feed table and the feed table is below the feed axis when the infeed chute is in the operational configuration, and wherein the feed table is laterally alongside the feed axis when the infeed chute is in the transport configuration.

5. The material reduction machine of claim 1, wherein the infeed chute includes a first outer dimension and a second outer dimension, wherein the first outer dimension is greater than the second outer dimension, wherein a vertical plane extends between a front end and a rear end of the material reduction machine, the second outer dimension extends in a parallel direction to the vertical plane and the first outer dimension extends in a perpendicular direction to the vertical plane when the infeed chute is in the operational configuration.

6. The material reduction machine of claim 5, wherein the second outer dimension extends in the perpendicular direction and the first outer dimension extends in the parallel direction when the infeed chute is in the transport configuration.

7. A material reduction machine comprising:

a front end;

a rear end opposite the front end;

a processing portion disposed between the front end and the rear end, the processing portion having a cutting mechanism; and an infeed chute opening toward the rear end to receive material to be reduced, the infeed chute having a plurality of guide walls configured to guide the material toward the processing portion along a feed axis, wherein the infeed chute is configured to rotate relative to the processing portion between an operational configuration and a transport configuration, wherein, when viewed along the feed axis, the material reduction machine defines an operational width when the infeed chute is in the operational configuration and a transport width when the infeed chute is in the transport configuration, and wherein the transport width is less than the operational width;

further comprising a controller configured to control the cutting mechanism and a sensor configured to determine if the infeed chute is in the operational configuration, wherein the controller is configured to prevent operation of the cutting mechanism when the infeed chute is not in the operational configuration.

8. The material reduction machine of claim 7, wherein the infeed chute has a first outer dimension and a second outer dimension, wherein the second outer dimension extends in a vertical direction and the first outer dimension extends in a horizontal direction when the infeed chute is in the operational configuration, wherein the first outer dimension defines the operational width of the material reduction machine.

9. The material reduction machine of claim 8, wherein the second outer dimension extends in the horizontal direction and the first outer dimension extends in the vertical direction when the infeed chute is in the transport configuration, wherein the second outer dimension is no wider than the transport width of the material reduction machine.

10. The material reduction machine of claim 7, wherein the transport width is 55% to 75% of the operational width.

11. The material reduction machine of claim 7, wherein the transport width is 0.75 to 1.0 meter.

12. The material reduction machine of claim 7, wherein the transport width is smaller than the operational width by 0.4 to 0.6 meter.

13. The material reduction machine of claim 7, wherein one of the plurality of guide walls of the infeed chute is a feed table and the feed table is below the feed axis when the infeed chute is in the operational configuration, and wherein the feed table is laterally alongside the feed axis when the infeed chute is in the transport configuration.

14. A material reduction machine configured to reduce a material, the material reduction machine comprising:

a front end;

a rear end spaced longitudinally from the front end;

an infeed chute disposed adjacent the rear end, the infeed chute having a feed table and a plurality of guide walls, the feed table and the plurality of guide walls forming a funnel that narrows from a distal end to a proximal end of the infeed chute, wherein the infeed chute as viewed longitudinally has a first outer dimension and a second outer dimension, the first outer dimension is larger than the second outer dimension;

a main portion including a processing portion with a rotatable cutting mechanism driven by a prime mover, the main portion having an inlet side coupled to the proximal end of the infeed chute to define a joint through which the material can pass from the infeed chute toward the rotatable cutting mechanism along a feed axis; and a rotation bearing situated longitudinally at the joint and encircling the joint to support rotation of an entirety of the infeed chute about a longitudinal axis of at least 90 degrees between an operational configuration in which the feed table is below the feed axis and a transport configuration in which the feed table is laterally alongside the feed axis, wherein the first outer dimension of the infeed chute extends in a horizontal direction in the operational configuration of the infeed chute, and the first outer dimension of the infeed chute extends in a vertical direction in the transport configuration of the infeed chute, wherein, when viewed longitudinally, an overall width of the material reduction machine is reduced by the rotation of the infeed chute from the operational configuration to the transport configuration;

further comprising a controller configured to control the rotatable cutting mechanism and a sensor configured to determine if the infeed chute is in the operational configuration, wherein the controller is configured to prevent operation of the rotatable cutting mechanism when the infeed chute is not in the operational configuration.

15. The material reduction machine of claim 14, wherein, with the infeed chute in the transport configuration, the second outer dimension of the infeed chute is the same as or less than the overall width of the material reduction machine.

16. The material reduction machine of claim 14, wherein the infeed chute is lockable in the operational configuration and lockable in the transport configuration.

17. The material reduction machine of claim 14, wherein the overall width when the infeed chute is in the transport configuration is 55% to 75% of the overall width when the infeed chute is in the operational configuration.

18. The material reduction machine of claim 14, wherein the infeed chute includes a folded portion adjacent the distal end of the infeed chute, the folded portion is configured to pivot perpendicular to the feed axis between an unfolded position and a folded position.

19. The material reduction machine of claim 18, wherein the material reduction machine defines a first length when the folded portion is unfolded, wherein the material reduction machine defines a second length when the folded portion is folded, wherein the first length is longer than the second length.

* * * * *